US009824112B1

(12) United States Patent
Gardner, III et al.

(10) Patent No.: US 9,824,112 B1
(45) Date of Patent: *Nov. 21, 2017

(54) CREATING EVENT STREAMS FROM RAW DATA

(71) Applicant: Google Inc., Mountain View, CA (US)

(72) Inventors: Alan Lee Gardner, III, Mountain View, CA (US); Nadav Aharony, Mountain View, CA (US); George Cody Sumter, Mountain View, CA (US)

(73) Assignee: Google Inc., Mountain View, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 14/622,769

(22) Filed: Feb. 13, 2015

Related U.S. Application Data

(60) Provisional application No. 61/941,470, filed on Feb. 18, 2014.

(51) Int. Cl.
*G06F 7/00* (2006.01)
*G06F 17/30* (2006.01)

(52) U.S. Cl.
CPC .............................. *G06F 17/30345* (2013.01)

(58) Field of Classification Search
None
See application file for complete search history.

(56) References Cited

U.S. PATENT DOCUMENTS

| 2005/0289505 | A1* | 12/2005 | Williams ................ G06F 9/485 717/103 |
| 2009/0132197 | A1 | 5/2009 | Rubin et al. |
| 2012/0023226 | A1 | 1/2012 | Petersen et al. |
| 2012/0278387 | A1 | 11/2012 | Garcia et al. |
| 2012/0299965 | A1* | 11/2012 | Agarwal ........... G06F 17/30572 345/660 |
| 2012/0303573 | A1 | 11/2012 | Pan et al. |
| 2013/0103764 | A1 | 4/2013 | Verkasalo |
| 2013/0190018 | A1 | 7/2013 | Mathews |

(Continued)

FOREIGN PATENT DOCUMENTS

| DE | WO-2013064174 A1 * | 5/2013 |
| WO | WP 2012129771 | 10/2012 |

OTHER PUBLICATIONS

Kovach, Steve, "How to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

*Primary Examiner* — Tuan A Pham
(74) *Attorney, Agent, or Firm* — Patent Law Works LLP

(57) ABSTRACT

The disclosure includes a system and method for creating event streams from raw data. The system includes a processor and a memory storing instructions that when executed cause the system to: receive a first event and a second event associated with a first user from a first user device; receive a third event associated with a second user from a second user device; determine one or more overlapping activities between the first event and the third event; update the first event using the third event to generate a first update event; update the third event using the first event to generate a second update event; generate a first event stream that includes the first update event and the second event for the first user; and generate a second event stream that includes the second update event for the second user.

18 Claims, 18 Drawing Sheets

(56) References Cited

U.S. PATENT DOCUMENTS

2013/0311482 A1* 11/2013 Schleier-Smith . G06F 17/30551
　　　　　　　　　　　　　　　　　　707/746
2014/0100835 A1　　4/2014　Majumdar et al.
2014/0249379 A1　　9/2014　Proud
2015/0127728 A1　　5/2015　Marti et al.
2015/0193888 A1　　7/2015　Sayed

* cited by examiner

US 9,824,112 B1

CREATING EVENT STREAMS FROM RAW DATA

CROSS REFERENCE TO RELATED APPLICATIONS

The present application claims priority, under 35 U.S.C. §119, of U.S. Provisional Patent Application No. 61/941,470, filed Feb. 18, 2014, and entitled "Creating Event Streams from Raw Data," which is incorporated by reference in its entirety.

BACKGROUND

The specification relates to managing user activities. More specifically, the specification relates to identifying a first event, identifying overlapping activities between the first event and a second event and updating the first event to include information from the second event.

An automated understanding of a person's behavior—what they are doing, their state of mind, and the overall context they are in—is a very difficult challenge. On the input side, enormous amounts of user data are available across different platforms including applications on the user's mobile device and personal desktop. For example, the user may use applications stored on the mobile device to read books, listen to music, view web pages, play games, etc. There are also many on-device sensors (e.g., accelerometers), environmental sensors (e.g., a motion sensor), as well as other signals, like whether a phone is currently plugged into a power outlet or not. These and other signals can also be used to help understand a user's behavior. Due to the large volume of data associated with the user, it can be difficult to get an overall understanding of the user's activities.

On the output side, human behavior is composed of many layers and complexities. There are individual activities that a user might be doing: playing a game on their phone, running, riding a train, or checking email. At a higher level the person might be at home, at work or on vacation. A person might be transitioning from place A to place B as a daily commute, as a business trip or as a permanent relocation.

SUMMARY

According to one innovative aspect of the subject matter described in this disclosure, a system and method for creating event streams from raw data are described. The method includes receiving a signal stream, saving data from the signal stream that indicates a change of state, identifying one or more activities associated with a first user from the filtered signal stream, aggregating the one or more activities to define a first event associated with the first user, receiving a second event associated with a second user from a second user device, identifying an association between the first user and the second user based on social network data, determining one or more overlapping activities between the first event and the second event, updating the first event using the second event to generate a first update event responsive to a determination of the one or more overlapping activities and generating a first event stream that includes the first update event for the first user.

According to another innovative aspect of the subject matter described in this disclosure, a computer implemented method comprises receiving a first event associated with a first user from a first user device; receiving a second event associated with a second user from a second user device; determining one or more overlapping activities between the first event and the second event, updating the first event using the second event to generate a first update event responsive to a determination of the one or more overlapping activities; and generating a first event stream that includes the first update event for the first user.

In general, another innovative aspect of the subject matter described in this disclosure may be embodied in methods that include: the second event including information about the first user being associated with the second event and the first user device lacking capabilities for detecting the second user device; determining the one or more overlapping activities further including retrieving social network data from a social network server, identifying an association between the first user and the second user based on the social network data and determining the one or more overlapping activities based on the association between the first user and the second user; the one or more overlapping activities being performed together by the first user and the second user.

In general, another innovative aspect of the subject matter described in this disclosure may be embodied in methods that include: sending the first event stream to the first user device; receiving a signal stream associated with the first user, saving data from the signal stream that indicates a change of state, identifying one or more activities associated with the first user from the filtered stream and aggregating the one or more activities to define the first event associated with the first user; detecting a presence of a third device associated with the first user device at a first timestamp, detecting a presence of the third device associated with the second user device at a second timestamp and responsive to a time difference being within a predetermined threshold, determining that the first user device and the second user device are within proximity of each other; polling for other user devices within proximity to the first user based on the other users associated with the other user devices being associated with the user on a social graph; generating analytics data associated with the one or more overlapping activities; posting content to a social network that includes content captured in association with overlapping activities; and determining that the first user owns a third user device based on proximity of the first user device to the third user device responsive to exceeding a threshold time period.

Other aspects include corresponding methods, systems, apparatus, and computer program products for these and other innovative aspects.

These and other embodiments may each optionally include one or more of the following features. For instance, the operations include: receiving an event stream from an event server; providing the event stream to the first user; saving data indicating a change in a state of the first user from the signal stream; synchronizing the first event with an event server; sending the first event stream to the first user device; and sending the second event stream to the second user device.

For instance, the features include: the one or more activities being related to a common subject and forming the first event; the first event sharing one or more overlapping activities with a second event associated with a second user; the event stream including an update event that is a combination of the first event and the second event; retrieving social network data from a social network server; identifying an association between the first user and the second user based on the social network data; determining the one or more overlapping activities based on the association between the first user and the second user; each of the one or more overlapping activities including a social aspect, an attention aspect, a mobility aspect, a mood aspect, a biomeasure aspect, a health and wellness aspect and a contextual aspect; the one or more overlapping activities being performed together by the first user and the second user; the one or more overlapping activities being related to a common subject; and each of the first update event and the second update event including a combination of the first event and the third event.

The disclosure may be particularly advantageous in a number of respects. First, the system can aggregate raw data from hardware sensors and/or from a virtual detector and infer human-understandable behavior from the raw data, where the raw data can be difficult for a human user to understand without processing. For example, the system is capable of identifying whether the user is running, walking or talking to another user from the raw data. Second, the system can create and provide an event stream to a user, where the event stream may include joint events shared between the user and other users. Third, the system can provide analytics data associated with the user's activities or events to the user. The system may also have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
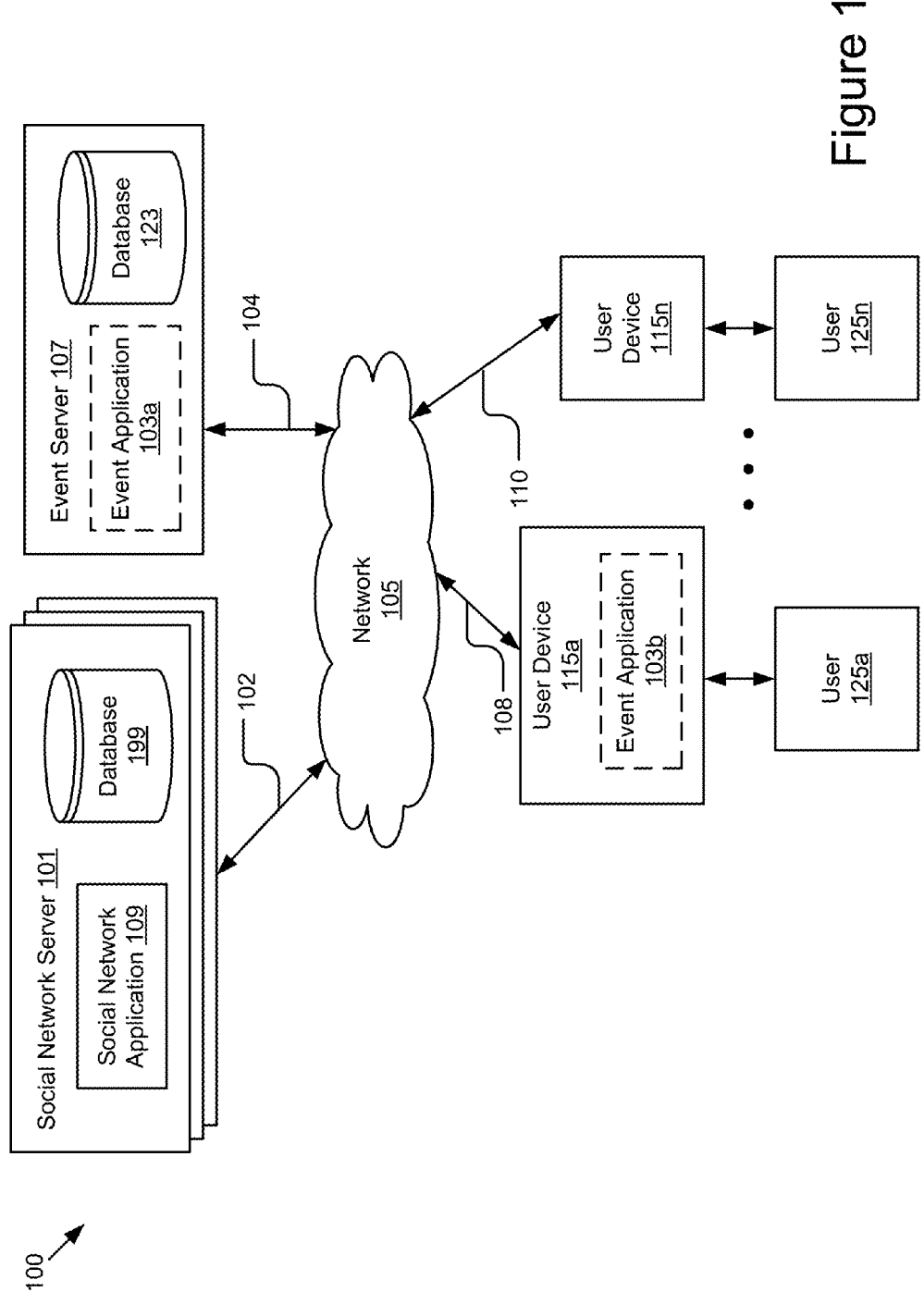
FIG. 1 is a block diagram illustrating an example system for creating event streams from raw data.

FIG. 1 illustrates a block diagram of some embodiments of a system 100 for creating event streams from raw data. The illustrated system 100 includes user devices 115*a* . . . 115*n* that can be accessed by users 125*a* . . . 125*n*, one or more social network servers 101 and an event server 107. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number. In the illustrated embodiment, these entities of the system 100 are communicatively coupled via a network 105. In some embodiments, the system 100 may include other servers or devices not shown in FIG. 1. For example, the system 100 may include an email server and a message server, etc. In some embodiments, an email server and a message server can be part of a social network server 101.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the user devices 115, the social network server 101 and the event server 107, in practice one or more networks 105 can be connected to these entities.

The social network server 101 can be a hardware server that includes a processor, a memory and network communication capabilities. The social network server 101 is communicatively coupled to the network 105 via signal line 102. In some embodiments, the social network server 101 sends and receives data to and from one or more of the user devices 115*a* . . . 115*n* and the event server 107 via the network 105. The social network server 101 includes a social network application 109 and a database 199. The database 199 stores social network data associated with users. For example, the database 199 stores social network data describing one or more of user profiles, posts, comments, videos, audio files, images, sharing of content, acknowledgements, etc., published on a social network. The system 100 may include multiple social network servers 101 that include traditional social network servers, email servers, micro-blog servers, blog servers, forum servers, message servers, etc.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating, and others may be of general interest or a specific focus.

In some embodiments, the event application 103a can be stored on an event server 107, which is connected to the network 105 via signal line 104. In some embodiments, the event server 107 can be a hardware server that includes a processor, a memory and network communication capabilities. The event server 107 sends and receives data to and from other entities of the system 100 via the network 105. While FIG. 1 illustrates one event server 107, the system 100 may include one or more event servers 107. In the illustrated embodiment, the event server 107 includes a database 123 for storing data associated with the event server 107.

In some embodiments, the event application 103b can be stored on a user device 115a, which is connected to the network 105 via signal line 108. In some embodiments, the user device 115a . . . 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated embodiment, the user 125a interacts with the user device 115a. The user device 115n is communicatively coupled to the network 105 via signal line 110. The user 125n interacts with the user device 115n. The user devices 115a . . . 115n in FIG. 1 are used by way of example. While FIG. 1 illustrates two user devices 115a and 115n, the disclosure applies to a system architecture having one or more user devices 115.

In some embodiments, the user device 115 can be a mobile device that is included in a device worn by the user 125. For example, the user device 115 is included as part of a clip (e.g., a wristband), part of a jewelry or part of a pair of glasses. In another example, the user device 115 can be a smart watch. The user 125 can view notifications from the event application 103 on a display of the device worn by the user 125. For example, the user 125 can view the notifications on a display of a smart watch or a smart wristband. The user 125 may also configure what types of notifications to be displayed on the device worn by the user 125. For example, the user 125 may configure the wearable device to blink for 5 seconds if a friend's mobile device is detected in proximity to the user 125.

In some embodiments, the event application 103 acts in part as a thin-client application that may be stored on the user devices 115a . . . 115n and in part that may be stored on the event server 107. For example, the event application 103b on the user device 115a generates events associated with the user 125a, and sends the events to the event application 103a on the event server 107. The event application 103a on the event server 107 creates an event stream for the user based on the events received from the event application 103b, and sends the event stream to the event application 103b on the user device 115a for presenting the event stream to the user 125a.

The event application 103 can be code and routines for creating event streams from raw data and providing the event streams to users. In some embodiments, the event application 103 can be implemented using hardware including a field-programmable gate array (FPGA) or an application-specific integrated circuit (ASIC). In some other embodiments, the event application 103 can be implemented using a combination of hardware and software. In some embodiments, the event application 103 may be stored in a combination of the devices and servers, or in one of the devices or servers. The event application 103 is described below in more detail with reference to FIGS. 2 and 5A-6B.

Figure 2:
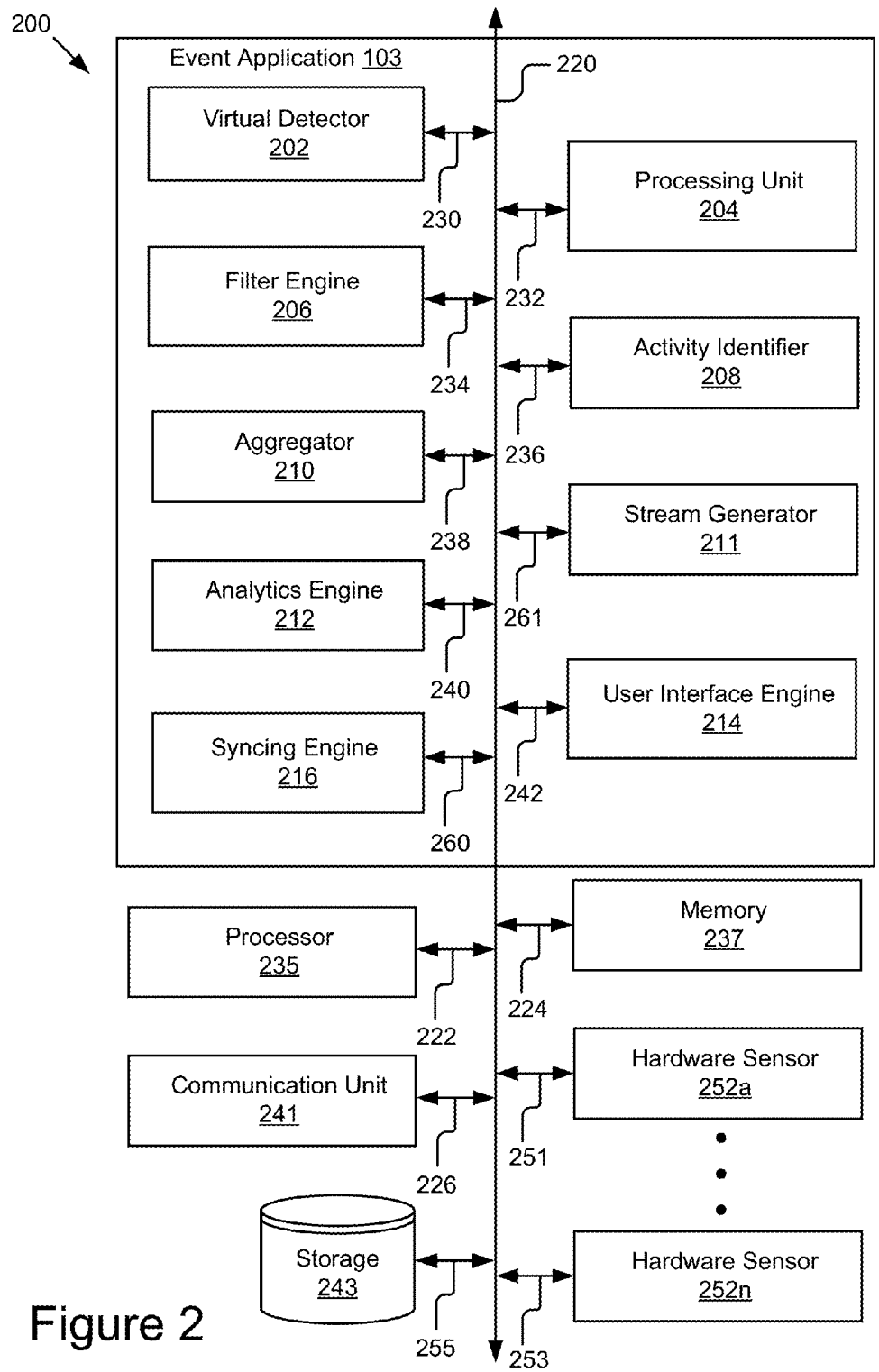
FIG. 2 is a block diagram illustrating an example of an event application.

Referring now to FIG. 2, an example of the event application 103 is shown in more detail. FIG. 2 is a block diagram of a computing device 200 that includes an event application 103, a processor 235, a memory 237, a communication unit 241, a storage device 243 and one or more hardware sensors 252a . . . 252n according to some examples. The components of the computing device 200 are communicatively coupled by a bus 220. In some embodiments, the computing device 200 can be one of a user device 115 and an event server 107.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the event server 107 and the social network server 101 depending upon where the event application 103 may be stored. The communication unit 241 is coupled to the bus 220 via signal line 226. In some embodiments, the communication unit 241 includes a port for direct physical connection to the network 105 or to another communication channel. For example, the communication unit 241 includes a USB, SD, CAT-5 or similar port for wired communication with the user device 115. In some embodiments, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS, and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some embodiments, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the storage device 243 is communicatively coupled to the bus 220 via signal line 255.

In some embodiments, the storage device 243 stores one or more of raw data, signal streams, activities performed by one or more users, analytics data associated with the activities, events and event streams associated with one or more users. The data stored in the storage device 243 is described below in more detail. In some embodiments, the storage device 243 may store other data for providing the functionality described herein.

The hardware sensors 252a . . . 252n can be sensors of conventional type. Example hardware sensors 252 include, but are not limited to, an infrared sensor, an accelerometer, a pedometer, a global positioning system (GPS) sensor, a Bluetooth detector, a power detector, a battery detector, a camera, a light detection and ranging (LIDAR) sensor, a motion detector, a thermostat, and a sound detector, etc. Other example hardware sensors 252 are possible. The hardware sensor 252a is communicatively coupled to the bus 220 via signal line 251, and the hardware sensor 252n is communicatively coupled to the bus 220 via signal line 253.

The one or more hardware sensors 252 generate sensor data and send the sensor data to a processing unit 204 of the event application 103. The sensor data generated by the one or more hardware sensors 252 is referred to as hardware raw data. Example hardware raw data includes, but is not limited to, data describing steps from a pedometer, data describing a geographic location (e.g., a latitude, a longitude and an elevation of a location) and a velocity from a GPS sensor, data describing presence of other devices in proximity to the user device 115 from a Bluetooth detector, data describing an acceleration from an accelerometer and data describing brightness in an environment from a light detector, data describing power usage on the user device 115 and battery life, etc. Other example hardware raw data is possible. In some embodiments, the one or more hardware sensors 252 generate the hardware raw data with permission from the user.

In the illustrated embodiment shown in FIG. 2, the event application 103 includes a virtual detector 202, a processing unit 204, a filter engine 206, an activity identifier 208, an aggregator 210, a stream generator 211, an analytics engine 212, a user interface engine 214, and a syncing engine 216. These components of the event application 103 are communicatively coupled to each other via the bus 220.

The virtual detector 202 can be software including routines for generating raw data. In some embodiments, the virtual detector 202 can be a set of instructions executable by the processor 235 to provide the functionality described below for generating raw data. In some embodiments, the virtual detector 202 can be stored in the memory 237 of the computing device 200 and can be accessible and executable by the processor 235. The virtual detector 202 may be adapted for cooperation and communication with the processor 235 and other components of the computing device 200 via signal line 230.

In some embodiments, the one or more hardware sensors 252 generate hardware raw data, and send the hardware raw data to the processing unit 204. The virtual detector 202 generates other raw data that is not related to hardware sensors 252, and sends the other raw data to the processing unit 204. The other raw data generated by the virtual detector 202 is referred to as virtual raw data. In some embodiments, the virtual detector 202 generates the virtual raw data with permission from the user.

Example virtual raw data includes, but is not limited to, software raw data related to software stored on the user device 115, mobile network information related to the user device 115's mobile network, file status on the user device 115, data describing interactions between the user and the user device 115 (e.g., the user turning up or turning down a sound volume, the user zooming into or zooming out of content displayed on the user device 115, the user scrolling down on a touch screen or typing in a user interface, etc.), data describing user interactions on a social network (e.g., the user viewing a social stream on a social network; the user publishing a post, sharing a web page, posting a comment, viewing a video, listening to an audio file, etc., on the social network), the user's online searching history, the user's browsing history and the user's communication history (e.g., messages, emails, etc.) with permission from the user, data describing application usage on the user device 115, etc. Other example virtual raw data is possible. In some embodiments, the virtual raw data includes metadata associated with the user device 115.

Example software raw data related to software stored on the user device 115 includes, but is not limited to, operating system information related to the user device 115, applications stored on the user device 115 and application usage information on the user device 115 (e.g., the user updating, opening, closing or deleting an application; the user configuring an application setting; battery drain from application usage, etc.). Other example software raw data is possible.

The processing unit 204 can be software including routines for receiving signal streams from the virtual detector 202 and/or one or more hardware sensors 252. In some embodiments, the processing unit 204 can be a set of instructions executable by the processor 235 to provide the functionality described below for receiving signal streams from the virtual detector 202 and/or one or more hardware sensors 252. In some embodiments, the processing unit 204 can be stored in the memory 237 of the computing device 200 and can be accessible and executable by the processor 235. The processing unit 204 may be adapted for cooperation and communication with the processor 235 and other components of the computing device 200 via signal line 232.

In some embodiments, the processing unit 204 receives a signal stream from the virtual detector 202, where the signal stream includes virtual raw data generated by the virtual detector 202. In some embodiments, the processing unit 204 receives a signal stream from one or more hardware sensors 252, where the signal stream includes hardware raw data generated by the one or more hardware sensors 252. In some other embodiments, the processing unit 204 receives a set of virtual raw data from the virtual detector 202 and a set of hardware raw data from the one or more hardware sensors 252, where the set of virtual raw data and the set of hardware raw data form a signal stream. The processing unit 204 sends the signal stream to the filter engine 206. In some embodiments, the processing unit 204 stores the signal stream in the storage 243. In some other embodiments, the processing unit 204 provides the signal stream to applications stored on the user device 115.

In some embodiments, the processing unit 204 saves data from the signal stream for a first state and next saves data that indicates a change in state. For example, at a first timestamp, the processing unit 204 receives a first set of location data from a GPS sensor indicating a user just arrived at a coffee shop, and stores the first set of location data in the storage 243. In some embodiments, the processing unit 204 categorizes the first timestamp as a start time for being at the coffee shop. At a second timestamp, if the processing unit 204 receives, from the GPS sensor, a second set of location data that is similar to the first set of location data, indicating the user is at the same location as the first timestamp, the processing unit 204 does not save the second set of location data. However, at a third timestamp, if the processing unit 204 receives, from the GPS sensor, a third set of location data that exceeds a threshold difference from the first and second sets of location data, indicating that the user left the coffee shop, the processing unit 204 saves the third set of location data in the storage 243. In some embodiments, the third timestamp represents both an end to the coffee shop event (also the end of a stationary activity) and a beginning of a motion activity. At the first timestamp, the user ended a transit moment since the user just arrives at the coffee shop; at the second timestamp, the user is still in a stationary moment since the user is still at the coffee shop; and at the third timestamp, the user is in a transit moment since the user leaves the coffee shop. The processing unit 204 saves data related to the transit moments and ignores data related to the stationary moments.

In some embodiments, the processing unit 204 has both a minimum and maximum threshold to ensure that there is enough distance between the locations but not so great a difference that the distance is inconceivable. For example, if there is an error in the location data that states that the location associated with the third timestamp is miles away from the second timestamp even though mere seconds have elapsed, the processing unit 204 ignores the outlier information. In other embodiments, the processing unit 204 retroactively revises the data in response to receiving additional information.

In one embodiment, the processing unit 204 receives a Bluetooth signal stream from a first user device 115 that detects a second user device 115 within proximity to the first user device 115. The processing unit 204 can discard data in the signal stream until the data indicates a change in status (i.e., the second user device 115 is no longer within proximity to the first user device 115).

In some examples, the processing unit 204 saves data from the signal stream that indicates a change of a frequency of steps, a change of velocity, a change of location, a change of application usage (e.g., an application being open or being closed), a change of actions on a social network (e.g., a user logging in or exiting from a social network account), a change related to presence of other user devices 115 or other changes in state. In some embodiments, the processing unit 204 also receives device identifiers of devices that are within proximity to the first user device 115.

The filter engine 206 can be software including routines for filtering signal streams. In some embodiments, the filter engine 206 can be a set of instructions executable by the processor 235 to provide the functionality described below for filtering signal streams. In some embodiments, the filter engine 206 can be stored in the memory 237 of the computing device 200 and can be accessible and executable by the processor 235. The filter engine 206 may be adapted for cooperation and communication with the processor 235 and other components of the computing device 200 via signal line 234.

In some embodiments, the filter engine 206 receives a signal stream from the processing unit 204. The filter engine 206 filters the signal stream to include data for defining one or more human-understandable actions. For example, the filter engine 206 filters the signal stream to define one or more human-understandable actions, and outputs a filtered signal stream that includes data for defining the one or more human-understandable actions.

For example, the filter engine 206 filters the signal stream to define steps, and outputs a filtered signal stream including step data from a pedometer. In another example, the filter engine 206 filters the signal stream to define motion, and outputs a filtered signal stream including one or more of acceleration data from an accelerometer, location data and velocity data from a GPS sensor. In yet another example, the filter engine 206 filters the signal stream to define application usage on a user device 115, and outputs a filtered signal stream that includes (1) data describing that an application is opened and/or closed on the user device 115 and (2) data indicating the user's interactions with the user device 115 (e.g., the user swiping fingers or scrolling down on a touch screen, etc.); (3) data indicating that the user device 115 is connected to a power source and being charged; and (4) data indicating which applications are consuming the user device's 115 battery.

In some embodiments, the filter engine 206 may filter the signal stream to include different combinations of data for defining the one or more human-understandable actions. For example, for defining a sleep activity, the filter engine 206 may filter the signal stream and output a filtered signal stream that includes one or more of the following: (1) acceleration data from an accelerometer, (2) power data from a power detector (e.g., power data indicating the user's mobile phone is power on or off), (3) brightness data in the environment from a light sensor (e.g., brightness data indicating lights are on or off), and/or (4) application indication data (e.g., the user's mobile phone being in a sleep mode or not). As a result, the filter engine 206 receives data from different virtual detectors 202 and hardware sensors 252 that can make up different applications on the user device 115 and uses the data to make different conclusions. For example, step data, movement data and social data are used to identify an activity being performed by the user.

The filter engine 206 may filter the signal stream to normalize the data and reconcile different data formats with each other. For example, the filter engine 205 converts raw data from a location application to human understandable location data. The filter engine 206 then reconciles the location data with raw data from an accelerometer to ensure that the data is consistent. In some embodiments, the activity identifier 208 then uses this data to confirm that the user is travelling in a car (vs. walking or travelling on a bicycle).

In one embodiment, the filter engine 206 filters out lower level signal streams when higher-level signal streams are available. For example, the location signal stream indicates that the user was in motion during a first timestamp and a fifth timestamp and stationary during a third timestamp and a fourth timestamp. A vehicle signal stream associated with a car indicates that the user was driving the car during these timestamps and the third and fourth timestamps represent the user being stopped at a light. As a result, the filter engine 206 filters the location signal stream in favor of the vehicle signal stream, which is then used by the activity identifier 208 to identify the activity of the user driving.

In some embodiments, the filtered signal stream includes data describing appearance and disappearance of another user device 115. For example, assume a Bluetooth sensor detects a presence of a friend's mobile device and generates data describing the presence of the friend's mobile device every five minutes from 1:00 PM to 1:30 PM. The filter engine 206 filters the data generated by the Bluetooth sensor, and outputs a filtered signal stream that only includes (1) data indicating an appearance of the friend's mobile device at 1:00 PM and (2) data indicating the friend's mobile device was last detected at 1:30 PM. In some other embodiments, the filtered signal stream includes data indicating a change of a frequency of steps, a change of velocity, a change of application usage (e.g., an application being open or being closed), a change of actions on a social network (e.g., a user logging in or exiting from a social network account), or other changes in actions.

In some embodiments, the filter engine 206 filters a location signal stream received from the processing unit 204 to identify other user devices 115 from a list of user devices 115 that have been known to be within proximity of the first user device 115. The list can include data from a Bluetooth sensor associated with a first user device 115 of a first user, where the data can be used to determine a presence of a second user device 115 that also has a Bluetooth sensor. For example, if the first user device 115 and the second user device 115 are in proximity, the first user device's 115 Bluetooth sensor generates data indicating the presence of the second user device 115. Other location detection methods are possible, such as getting geo-location information from GPS applications, information from the social network, etc. Other devices are possible, for example, Bluetooth low energy, WiFi, ZigBee, etc.

In some examples, the data indicating the presence of the second user device 115 can also indicate a presence of a second user associated with the second user device 115 (e.g., the first user and the second user are in proximity). For example, if the second user device 115 is a mobile device, the presence of the mobile device may indicate the presence of the second user. In some embodiments, the filter engine 206 filters the signal stream to additionally include received signal strength indicator (RSSI) data from the Bluetooth sensor for increased granularity. Using a list of device identifiers to locate other users within proximity to the first user device can be helpful for saving battery life of the first user device. Instead of the first user device 115 continually scanning for other user devices 115 within proximity, the first user device 115 can instead scan for a limited set of other user devices 115.

The detection using the Bluetooth sensors is easy to implement and can be turned on automatically with the user's permission. The user's permission can be obtained, for example, when the application is first downloaded or each time the Bluetooth sensors are activated. If the two user devices 115 are within the detection radius of the Bluetooth sensors, the detection yields accurate results. However, some devices may not be able to be discovered by Bluetooth sensors. For example, an old device may not be detected by a user device 115 having Bluetooth sensors.

In some embodiments, the filter engine 206 filters a first signal stream, and outputs a first filtered signal stream that includes a first set of data from a first Bluetooth sensor associated with a first user device 115 of a first user. The first set of data indicates the first user device 115 detects a presence of a third device at a first timestamp. Also, the filter engine 206 filters a second signal stream, and outputs a second filtered signal stream that includes a second set of data from a second Bluetooth sensor associated with a second user device 115 of a second user. The second set of data indicates the second user device 115 detects a presence of the third device at a second timestamp. If the time difference between the first timestamp and the second timestamp is within a predetermined threshold (e.g., five seconds), the first set of data and the second set of data can be used by the activity identifier 208 to determine that the first user device 115 and the second user device 115 are in proximity since both of the two user devices 115 detect the third device within a short time period. In another embodiment, the filter engine 206 filters the signal streams to identify a beginning and an end of the two user devices 115 being within proximity. The activity identifier 208 is described below in more detail.

For example, assume the third device is a vehicle. If the vehicle is detected almost simultaneously by two mobile devices of two users, the two users are very likely to be in the same vehicle. The first and second filtered signal streams may additionally include velocity data from GPS sensors respectively. If the velocity data indicates the two users are moving, the activity identifier 208 can estimate the two users are travelling in the same vehicle. In another example, assume the third device is a device at home with a Bluetooth sensor (e.g., a Bluetooth-enabled personal computer). If the device at home is respectively detected by two mobile devices of two users within a predetermined time window (e.g., within 10 seconds), the activity identifier 208 can estimate that the two users are at home. In some examples, the activity identifier 208 estimates two users as being together if the location data from GPS sensors indicates the two users' geo-locations are the same.

In some embodiments, the filter engine 206 filters the signal streams to additionally include received signal strength indicator (RSSI) data for increased granularity. In some embodiments, the filter engine 206 may poll for specific known devices by filtering available devices based on a social graph of a user and/or the user's location. For example, the filter engine 206 identifies a group of devices used by the user's friends. In another example, the filter engine 206 identifies a group of devices at the same location as the user. In yet another example, the filter engine 206 identifies a group of devices that are used by the user's friends and at the same location as the user.

The activity identifier 208 can be software including routines for identifying activities. In some embodiments, the activity identifier 208 can be a set of instructions executable by the processor 235 to provide the functionality described below for identifying activities. In some embodiments, the activity identifier 208 can be stored in the memory 237 of the computing device 200 and can be accessible and executable by the processor 235. The activity identifier 208 may be adapted for cooperation and communication with the processor 235 and other components of the computing device 200 via signal line 236.

Example activities include, but are not limited to, physical activities (e.g., running, walking, sleeping, driving, talking to someone, biking, talking to a group, hiking, etc.), activities on social networks (e.g., playing online games on a social network, publishing posts and/or comments, acknowledging posts, sharing posts, etc.) and activities on user devices 115 (e.g., opening an application, listening to a playlist, calling a contact, writing emails, viewing photos, watching videos, etc.). Other example activities are possible.

In some embodiments, the activity identifier 208 receives a filtered signal stream from the filter engine 206, and identifies one or more activities from the filtered signal stream. For example, assume the filtered signal stream includes step data from a pedometer. The activity identifier 208 identifies that the user is walking if the frequency of steps conforms to the user's walking pace. However, if the frequency of steps conforms to the user's running pace, the activity identifier 208 identifies that the user is running. In another example, the filtered signal stream includes (1) acceleration data indicating zero acceleration from an accelerometer, (2) timestamp data indicating the time is midnight from a GPS sensor; (3) brightness data indicating lights are off from a light detector, (4) power usage indicating that the user device 115 is connected to a charger and (5) application usage indicating that the applications are not being used. The activity identifier 208 identifies that the user is sleeping based on the filtered signal stream. In another example, if the user is categorized as a marathon runner, the activity identifier 208 is more likely to identify the user activity as running than other activities such as biking, swimming, etc.

In some embodiments, the activity identifier 208 determines user activities based data received from multiple virtual detectors 202 and/or hardware sensors 252. For example, the filtered signal stream includes data indicating (1) a game application is running on the user device 115 and (2) the user is swiping fingers on the touch screen of the user device 115. The activity identifier 208 identifies that the user is playing a game on the user device 115. In another example, the filtered signal stream includes (1) data describing steps from a pedometer, (2) data describing that a music application is running on the user device 115 from the virtual detector 202, and (3) data describing a friend's mobile device is detected in proximity to the user device 115 from a Bluetooth sensor of the user device 115. The activity identifier 208 identifies that the user is listening to music and jogging with the friend based on the usage of the music application, the frequency of steps and presence of the friend's mobile device in proximity to the user device 115. In yet another example, the filtered signal stream includes (1) location data describing the user is currently in a coffee shop from a GPS sensor of the user device 115 and (2) data describing a friend's mobile device is detected in proximity to the user device 115 from a Bluetooth sensor of the user device 115. The activity identifier 208 identifies that the user is meeting with the friend at the coffee shop.

In some embodiments, the activity identifier 208 retrieves data describing a user profile from the social network server 101 with permission from the user. The user profile includes one or more of the user's age, gender, education background, working experience, interests and other demographic information. The activity identifier 208 identifies one or more activities associated with the user from the filtered signal stream based on the user profile. For example, for a particular frequency of steps determined based on the step data from a pedometer, the activity identifier 208 may determine that the user is running if the user is a senior over 60 years old. However, the activity identifier 208 may determine that the user is walking at a fast pace if the user is a young athlete.

In some embodiments, the activity identifier 208 identifies a social aspect, an attention aspect, a mobility aspect, a mood aspect, a biomeasure aspect, a health and wellness aspect and/or a contextual aspect for each activity based on the filtered signal stream. A social aspect indicates who is with the user during the activity. For example, a social aspect of a running activity indicates that a friend runs together with the user. In another example, a social aspect of a meeting indicates whether the user attends a business meeting or meets with friends. An attention aspect indicates what the user focuses on. For example, an attention aspect of a gaming activity indicates the user focuses his or her attention on the game application. A mobility aspect indicates a state of the user. For example, the mobility aspect indicates the user is sitting or moving during the activity. In some embodiments, the mobility aspect describes the user's geo-location. For example, the mobility aspect indicates the user is driving on a highway. A mood aspect indicates whether the user was happy, unhappy, etc. A biomeasure aspect measures biometric data associated with the user. For example, high blood pressure or a fast heartbeat may indicate an agitated state. A contextual aspect is based on a location or activity, for example, whether the user is at home, work, on vacation, at a coffee shop, etc.

In some embodiments, the filtered signal stream includes change in actions, and the activity identifier 208 identifies a beginning and/or an ending of an activity from the filtered signal stream. For example, at a first timestamp, the activity identifier 208 identifies a beginning of a running activity if the filtered signal stream includes data indicating that the frequency of the user's steps increases from a walking pace to a running pace. At a second timestamp, the activity identifier 208 identifies an ending of the running activity if the filtered signal stream includes data indicating the frequency of the user's steps decreases from a running pace to a walking pace. In another example, at a first timestamp, the activity identifier 208 identifies a beginning of a dining activity if the filtered signal stream includes (1) location data indicating the user arrives at a restaurant and (2) data indicating presence of a friend's mobile device in proximity to the user's mobile device. At a second timestamp, the activity identifier 208 identifies an ending of the dining activity if the filtered signal stream includes location data indicating the user leaves the restaurant.

The aggregator 210 can be software including routines for aggregating activities associated with a user to define events. In some embodiments, the aggregator 210 can be a set of instructions executable by the processor 235 to provide the functionality described below for aggregating activities associated with a user to define events. In some embodiments, the aggregator 210 can be stored in the memory 237 of the computing device 200 and can be accessible and executable by the processor 235. The aggregator 210 may be adapted for cooperation and communication with the processor 235 and other components of the computing device 200 via signal line 238.

Figure 4A:
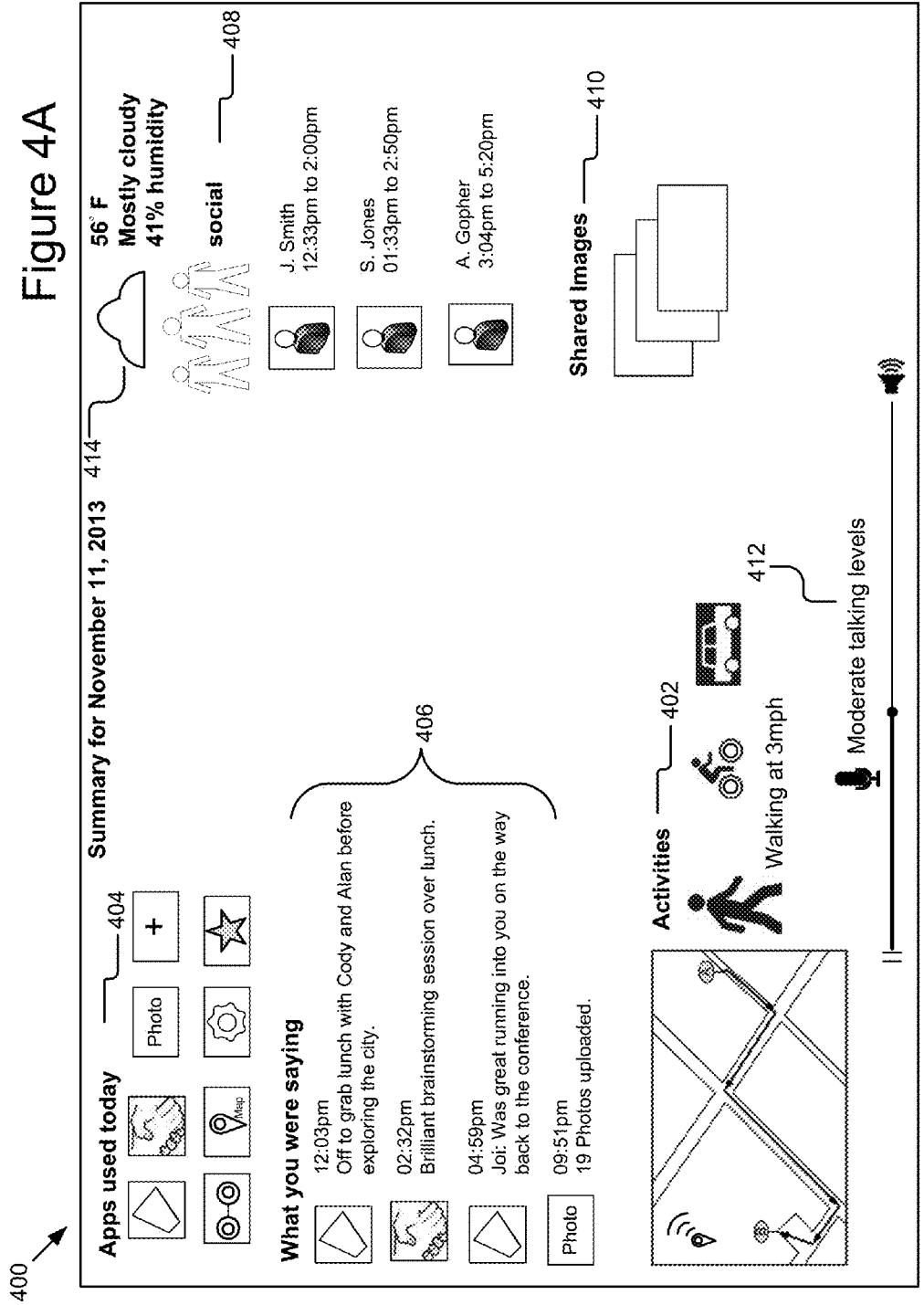
FIG. 4A is a graphic representation of another example user interface for providing a summary of a user's activities.

In some embodiments, the aggregator 210 receives activities associated with a user from the activity identifier 208 and generates a summary of the user's activities during a specified time period. For example, the aggregator 210 generates a summary of the user's physical activities, activities on social networks and activities on user devices 115 during a day, a week or a month. In a further example, the aggregator 210 generates a summary of applications used by the user, posts published by the user, people meeting with the user, photos shared by the user, videos viewed by the user and other physical activities (e.g., biking, walking. etc.) performed by the user during the specified time period. The aggregator 210 may notify the user of the summary of the activities. An example user interface summarizing a user's activities in a day is illustrated in FIG. 4A.

The aggregator 210 aggregates one or more activities associated with a user to define an event related to the user. An event can be data describing a story of a user. In some embodiments, an event includes a single activity performed during a particular time period. For example, an exercise event describes that the user ran in a park from 6:00 AM to 6:30 AM. In some embodiments, an event includes multiple activities performed by a user during a particular time period. For example, a Saturday social event from 3:00 PM to 10:00 PM includes shopping with friends in a mall from 3:00 PM to 6:00 PM, dining with the friends in a restaurant from 6:00 PM to 8:00 PM, and going to a movie with the friends from 8:00 PM to 10:00 PM.

In some embodiments, an event includes multiple activities related to a particular subject. For example, a gaming event includes playing a video game with a friend, posting a gaming result on a social network, sharing gaming photos online and posting comments on the gaming result. In some other embodiments, an event includes one or more activities performed at the same location. For example, a sports event includes watching a sports game with friends in a stadium, taking photos of the sports game, shopping for a jersey in the stadium and encountering a colleague in the stadium, etc. Other example events are possible.

The stream generator 211 can be software including routines for generating event streams. In some embodiments, the stream generator 211 can be a set of instructions executable by the processor 235 to provide the functionality described below for generating event streams. In some embodiments, the stream generator 211 can be stored in the memory 237 of the computing device 200 and can be accessible and executable by the processor 235. The stream generator 211 may be adapted for cooperation and communication with the processor 235 and other components of the computing device 200 via signal line 261.

In some embodiments, the stream generator 211 receives one or more events associated with a user from the aggregator 210, and generates an event stream for the user using the one or more events. An event stream can be data describing a sequence of events associated with a user. For example, an event stream describes a user's events in a day, a week or a month, etc. An event stream organizes a user's events according to one or more criteria. In some embodiments, an event stream organizes a user's events in a chronological order. For example, an event stream organizes the user's events into historical events and real-time events. In another example, an event stream organizes the user's events according to the time when the events occur. In some embodiments, an event stream may organize the user's events according to one or more of (1) the subjects of the events (e.g., sports events, music concert events, social gathering events, etc.), (2) other users participating in the events (e.g., family events, friends' events, business events, etc.), (3) locations related to the events, (4) whether the user would find the events to be interesting, (5) whether the events are typical or off baseline/out of a normal behavior range, etc. With regard to determining whether the user would find the events to be interesting, in some embodiments the stream generator 211 generates a stream based on the user's interests. In some embodiments, the stream generator 211 modifies the stream based on feedback received by the analytics engine 212. With regard to determining whether events are typical, the stream generator 211 could generate a stream with only normal events, such as going to work, or only unusual events, such as going on vacation, etc.

In some embodiments, the stream generator 211 is stored on the event server 107, and receives a first event related to a first user from a first user device 115 and a second event related to a second user from a second user device 115. The stream generator 211 retrieves social network data associated with the first user with permission from the first user or social network data associated with the second user with permission from the second user, and determines whether the first user is socially connected to the second user based on the social network data. For example, the stream generator 211 determines whether the first user and the second user are friends, family members, colleagues or acquaintances connected in a social graph. It can be advantageous to have the stream generator 211 perform the processing on the event server 107 instead of user devices 115 because the computations could drain the battery on a user device 115.

If the first user is socially connected to the second user (e.g., the first user and the second user are connected as friends in a social graph), the stream generator 211 determines whether there is at least one overlapping activity between the first event and the second event. In some embodiments, the stream generator 211 determines whether the first user and second user have a relationship on the social graph that exceeds a threshold before considering whether the users were together for an overlapping activity. For example, where the first user and second user have a greater than first degree relationship, the stream generator 211 does not determine whether there is an overlapping activity between the users.

An overlapping activity can be an activity that relates to both the first user and the second user. Example overlapping activities associated with two or more users include, but are not limited to, the same activity performed together by the two or more users (e.g., two friends playing online games together from their homes respectively), the same activity performed by the two or more users at the same location and the same time (e.g., two friends bowling together at a bowling place), different activities performed by the two or more users and related to the same subject (e.g., a user playing as a quarterback in a football game in a stadium, a family member of the user viewing the football game in the stadium, a first friend of the user viewing the football game through an online rebroadcast, a second friend of the user sharing a video of the football game with the user, etc.), etc.

If there are one or more overlapping activities between the first event and the second event, the stream generator 211 updates the first event using the second event to create a first update event for the first user. For example, the stream generator 211 combines the first event and the second event to create a first update event. The stream generator 211 also updates the second event using the first event to create a second update event. For example, the first update event and the second update event include a combination of the first event and the second event. In some other embodiments, the first update event is different from the second update event. For example, the first update event includes a combination of the first event and the second event; however, the second update event includes the one or more overlapping activities between the first event and the second event. This can be particularly helpful where the first user device 115 is lacking Bluetooth capabilities for detecting other devices. Since the second user device 115 is Bluetooth capable and it detects the first user device 115, the first event can be updated with a second event that includes evidence of the second user being present for the event. In this way, the application helps overcome hardware deficiencies.

In some examples, the stream generator 211 updates the first event using the second event with permission from the second user, and updates the second event using the first event with permission from the first user. This is helpful, for example, to confirm that the two users were at the event together and not just people who happened to be within proximity of each other. The stream generator 211 can also use multiple sources to make such determinations, such as Bluetooth data and check-ins with both users on a social network.

In one example, the stream generator 211 receives a first event of a user that includes (1) a first activity of bowling at a bowling place on a Friday night and (2) a second activity of posting a photo of the bowling place on a social network. The stream generator 211 receives a second event from the user's friend that includes (1) a third activity of bowling at the same bowling place on the same Friday night and (2) a fourth activity of publishing a post commenting on the coffee at the bowling place. The stream generator 211 determines that the first activity of the user and the third activity of the friend are overlapping activities, indicating that the user and the friend bowled together at the bowling place. The stream generator 211 updates the first event using the second event to generate a first update event, where the first update event includes the user's first activity, the user's second activity and the friend's fourth activity. For example, the first update event describes that the user bowled with the friend at the bowling place on Friday night, the user posts a photo of the bowling place on the social network and the friend publishes a post commenting on the coffee at the bowling place. The stream generator 211 also updates the second event using the first event to generate a second update event, where the second update event is identical to the first update event.

In one example, the stream generator 211 receives a first event of a user that includes (1) a first activity of bowling at a bowling place on a Friday night and (2) a second activity of posting a photo of the bowling place on a social network. The stream generator 211 receives a second event from the user's friend that includes (1) a third activity of bowling at the same bowling place on the same Friday night and (2) a fourth activity of publishing a post commenting on the coffee at the bowling place. The stream generator 211 determines that the first activity of the user and the third activity of the friend are overlapping activities, indicating that the user and the friend bowled together at the bowling place. The stream generator 211 updates the first event using the second event to generate a first update event, where the first update event includes the user's first activity, the user's second activity and the friend's fourth activity. For example, the first update event describes that the user bowled with the friend at the bowling place on Friday night, the user posts a photo of the bowling place on the social network and the friend publishes a post commenting on the coffee at the bowling place. The stream generator 211 also updates the second event using the first event to generate a second update event, where the second update event is identical to the first update event.

In some examples, the stream generator 211 determines an overlapping activity between the first event and the second event based on a detection describing that the first user device 115 is in proximity to the second user device 115. For example, the stream generator 211 receives a first event of a user that includes (1) a first activity of bowling at a bowling place on a Friday night and (2) a second activity of detecting presence of a friend's mobile device in proximity to the user's mobile device. The stream generator 211 receives a second event of the user's friend that includes a third activity of publishing a post commenting on the coffee at the bowling place. In this example, the friend's mobile device may not be able to detect presence of the user's mobile device. The stream generator 211 determines that the first activity of the user is an overlapping activity between the first event and the second event, since the user's mobile device detects a presence of the friend's mobile device at the bowling place, indicating that the user and the friend bowled together at the bowling place. The stream generator 211 updates the first event using the second event to generate a first update event, where the first update event includes the user's first activity, the user's second activity and the friend's third activity. For example, the first update event describes that the user plays bowling with the friend at the bowling place on Friday night and the friend publishes a post commenting on the coffee at the bowling place. The stream generator 211 also updates the second event using the first event to generate a second update event, where the second update event is identical to the first update event.

The stream generator 211 generates a first event stream for the first user that includes the first update event in addition to the first user's other events, and generates a second event stream for the second user that includes the second update event in addition to the second user's other events. The first update event and the second update event are examples of a shared event between the first event stream and the second event stream. The first event stream and the second event stream may have other shared events. In some embodiments, a shared event includes the one or more overlapping activities. In some other embodiments, a shared event includes a combination of the first event and the second event that have one or more overlapping activities. In some other embodiments, a shared event is identical to the first update event or the second update event.

In some embodiments, the stream generator 211 generates (1) a first private event stream for the first user that includes the first user's private events, (2) a second private event stream for the second user that includes the second user's private events and (3) a shared event stream for the first user and the second user with permission from the first user and the second user. The shared event stream includes shared events between the first user and the second user. The first user and the second user may select what events to be shared, which events not to be shared in the shared event stream and who can view the shared event stream.

In some embodiments, the stream generator 211 identifies that the first user is not socially connected to the second user in a social graph. For example, the stream generator 211 determines that the first user and the second user are strangers. The stream generator 211 does not determine overlapping activities and shared events between the first event and the second event since, for example, the first user and the second user are strangers. The stream generator 211 generates a first event stream for the first user including the first event and the first user's other events, and generates a second event stream for the second user including the second event and the second user's other events.

In some other embodiments, even if the first user is not socially connected to the second user in a social graph, the stream generator 211 may generate a public shared event stream if the first event and the second event include overlapping activities that the first user and the second user select to share publicly. The public shared event stream includes the overlapping activities and can be accessed by the public. For example, assume the first user and the second user are visiting a park and taking photos of birds in the park. The first user and the second user are also posting live photos of birds in the park on a social network and invite other people to view and comment on the photos. The stream generator 211 can generate a public shared event stream that includes (1) the first user's public photos of birds in the park, (2) the second user's public photos of birds in the park and (3) locations in the park where the photos are taken. The public shared event stream can be updated and accessed by all the users in the park in real time and help the users to find out birds in the park in real time.

In some embodiments, the stream generator 211 receives data indicating that the social connection is only in one direction. For example first user follows the second user in the social graph, but the second user does not follow the first user. The stream generator 211 retrieves a first set of events associated with the first user (e.g., the first user's historical events and real-time event) and a second set of events associated with the second user (e.g., the second user's historical events and real-time event) from the database 123. The stream generator 211 determines whether there are overlapping activities between the first set of events and the second set of events. If there are overlapping activities, the stream generator 211 generates a shared event stream for the first user and the second user based on the overlapping activities but asks the second user for permission to publish the shared events since the second user does not follow the first user.

The stream generator 211 on the event server 107 sends the first event stream to the first user device 115 and the second event stream to the second user device 115 respectively. In some embodiments, the stream generator 211 sends the shared event stream to both the first user device 115 and the second user device 115. In some embodiments, the stream generator 211 stores the first event stream, the second event stream and/or the shared event stream in the database 123.

The analytics engine 212 can be software including routines for generating analytics data. In some embodiments, the analytics engine 212 can be a set of instructions executable by the processor 235 to provide the functionality described below for generating analytics data. In some embodiments, the analytics engine 212 can be stored in the memory 237 of the computing device 200 and can be accessible and executable by the processor 235. The analytics engine 212 may be adapted for cooperation and communication with the processor 235 and other components of the computing device 200 via signal line 240.

In some embodiments, the analytics engine 212 receives activities associated with a user from the activity identifier 208. In some other embodiments, the analytics engine 212 receives a summary of activities associated with the user from the aggregator 210. The analytics engine 212 analyzes the activities to generate analytics data for the activities. In some embodiments, the analytics engine 212 uses behavioral analytics to generate the analytics data. Example analytics data includes, but is not limited to, how frequently (e.g., number of times, time elapsed in a 24 hour period) the user is stationary or in motion, how frequently the user performs a particular activity, which other users are usually with the user when the user performs a particular activity (e.g., which friend is usually running together with the user), what is the user's preference when performing a particular activity (e.g., the user usually turns up the volume when a music application plays a particular song), how frequently a first user is with a second user in the past week, year, etc., a common location where the user performs a particular activity (e.g., the user usually goes to a particular bar when meeting with friends), etc. Other example analytics data is possible.

In some embodiments, the analytics engine 212 receives one or more events associated with a user from the aggregator 210, and generates analytics data associated with the one or more events. For example, the analytics engine 212 determines how frequently a particular event occurs, which other users are usually with the user when the event occurs, a common location where the event occurs, how many events are unique events, a total number of the events, etc. Other example analytics data associated with the user's events is possible.

In some embodiments, the analytics engine 212 receives overlapping activities and/or shared events from the stream generator 211, and generates analytics data associated with the overlapping activities and/or the shared events. For example, the analytics engine 212 determines how frequently the overlapping activities and/or the shared events occur, which users are associated with the overlapping activities and/or the shared events, locations where the overlapping activities and/or the shared events occur, how many shared events are unique events, a total number of the overlapping activities and/or a total number of the shared events, etc. Other example analytics data is possible.

In some embodiments, the analytics engine 212 receives overlapping activities and/or shared events from the stream generator 211, and generates analytics data associated with the overlapping activities and/or the shared events. For example, the analytics engine 212 determines how frequently the overlapping activities and/or the shared events occur, which users are associated with the overlapping activities and/or the shared events, locations where the overlapping activities and/or the shared events occur, how many shared events are unique events, a total number of the overlapping activities and/or a total number of the shared events, etc. Other example analytics data is possible.

In some embodiments, the analytics engine 212 uses additional information from user activities to inform the user's activities with reference to the user device. For example, if the first user provided search terms about soccer to a search engine, the analytics engine 212 determines that the first user is more likely to perform an activity associated with soccer. An example use of the system described herein includes adding context information to web analytics and/or application usage analytics. For example, the system can anonymously determine whether people use a particular application or visit a particular web page while in commute, driving a vehicle, at home, or at work without exposing specific user data. The context information can be combined or supplemented with analytics data from web page usage (e.g., web search) and application usage to improve behavior identification from raw data as well as to make suggestions or provide advertisements to users.

Another example use of the system includes implementing a viral spreading mechanism for promoting applications. For example, a user that has installed an application can share an event with another user using a web view option, where the other user has not yet installed the application. The other user may be provided with an option to install the application in the web view of the shared event. Other example uses of the system are possible.

In another embodiment, the analytics engine 212 uses the analytics data to make determinations about ownership of user devices. For example, if a first user device detects a second user device within proximity responsive to exceeding a threshold time period (such as from 5:00 PM to 8:00 AM during the weekdays), the analytics engine 212 determines that the first user owns the second user device. This is true, for example, when a user comes home from work every night and is within proximity to home user devices, such as televisions and laptops. Conversely, if the second user device is only detected intermittently, such as if the first user visits a second user's home, the correlation is not strong enough to make a determination about ownership.

The user interface engine 214 can be software including routines for generating graphical data for providing user interfaces to users. In some embodiments, the user interface engine 214 can be a set of instructions executable by the processor 235 to provide the functionality described below for generating graphical data for providing user interfaces to users. In some embodiments, the user interface engine 214 can be stored in the memory 237 of the computing device 200 and can be accessible and executable by the processor 235. The user interface engine 214 may be adapted for cooperation and communication with the processor 235 and other components of the computing device 200 via signal line 242.

In some embodiments, the user interface engine 214 generates graphical data for providing a user interface that depicts a summary of a user's activities. The user interface engine 214 sends the graphical data to a user device 115, causing the user device 115 to present the user interface to the user. Example user interfaces are shown in FIGS. 3A-3G, 4A, 4C and 4D. In some embodiments, the user interface engine 214 generates graphical data for providing a user interface that depicts an event associated with one or more users. Example user interfaces depicting events are illustrated in FIGS. 4C-4E. A user may modify or update the event notification, add more peers to the event, share the event, add description for photos, make comments on the event, add or update a title for the event, or perform other actions on the event using the user interface.

In some embodiments, the user interface engine 214 generates graphical data for providing a user interface that depicts an event stream and/or a shared event stream to a user. In some other embodiments, the user interface engine 214 generates graphical data for providing a user interface that depicts analytics data to a user. The user interface engine 214 may generate graphical data for providing other user interfaces to users.

The syncing engine 216 can be software including routines for synchronizing data between a user device 115 and an event server 107. In some embodiments, the syncing engine 216 can be a set of instructions executable by the processor 235 to provide the functionality described below for synchronizing data between a user device 115 and an event server 107. In some embodiments, the syncing engine 216 can be stored in the memory 237 of the computing device 200 and can be accessible and executable by the processor 235. The syncing engine 216 may be adapted for cooperation and communication with the processor 235 and other components of the computing device 200 via signal line 260.

In some embodiments, the syncing engine 216 synchronizes events between the user device 115 and the event server 107. For example, the syncing engine 216 sends events generated by the user device 115 to the event server 107. The event server 107 may update the events. For example, the event server 107 may update an event to include that a friend also participates in the event. The syncing engine 216 may send the updated event from the event server 107 to the user device 115. In some embodiments, the syncing engine 216 synchronizes an event stream between the user device 115 and the event server 107. For example, the stream generator 211 stored on the event server 107 updates an event stream associated with a user, and the syncing engine 216 sends the updated event stream to a user device 115 associated with the user.

Figure 3A:
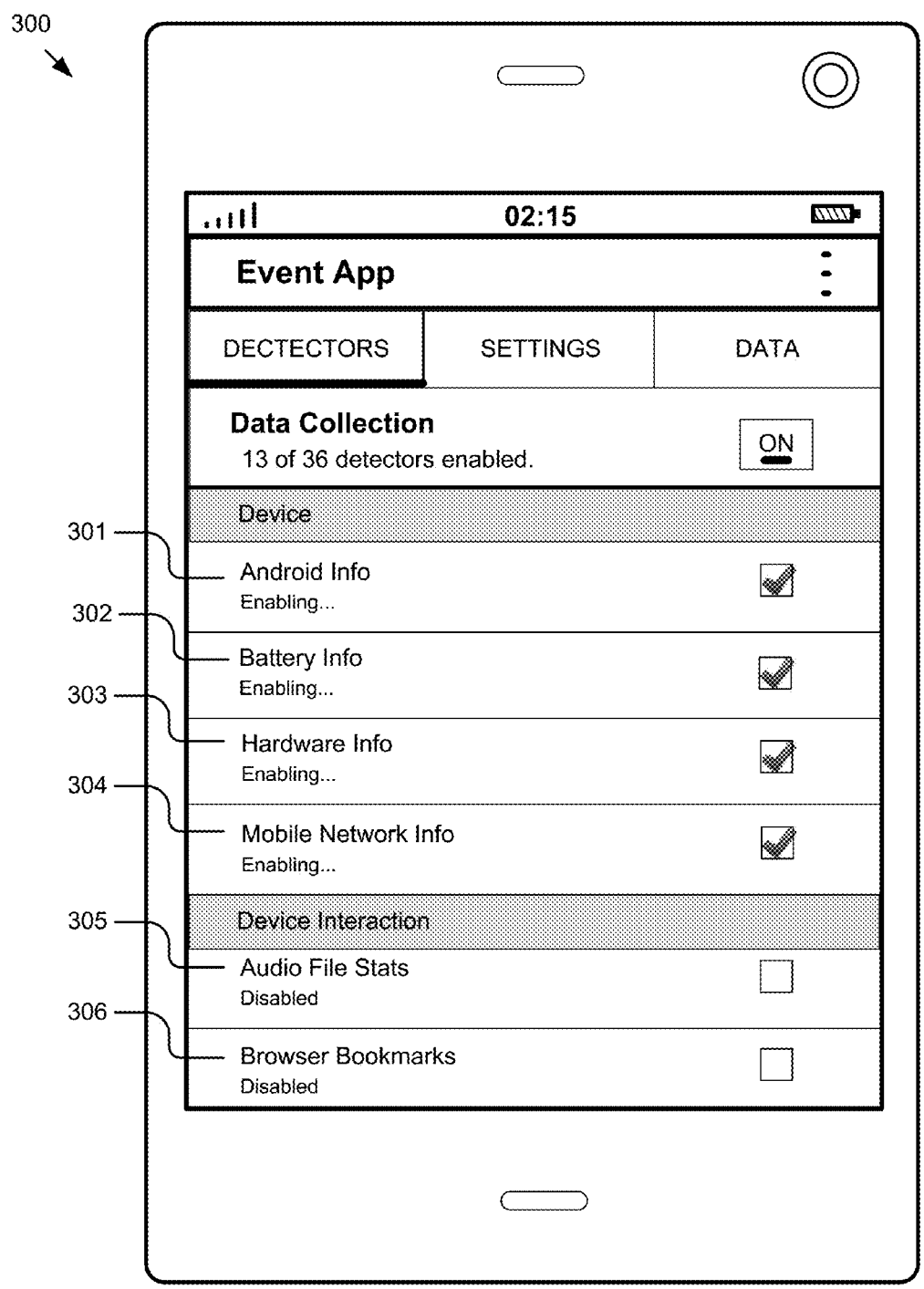
FIG. 3A is a graphic representation of an example user interface for collecting raw data from a user device.

FIG. 3A is a graphic representation 300 of an example user interface for collecting data from a user device 115. Example data collected from the user device 115 includes device data (e.g., operating system information 301, battery information 302, hardware information 303, mobile network information 304, etc.) with permission from the user. In some embodiments, the user can deactivate at least part of the data collection. For example, the user can disable collection of device interaction data (e.g., audio file status 305, browser bookmarks 306, etc.).

Figure 3B:
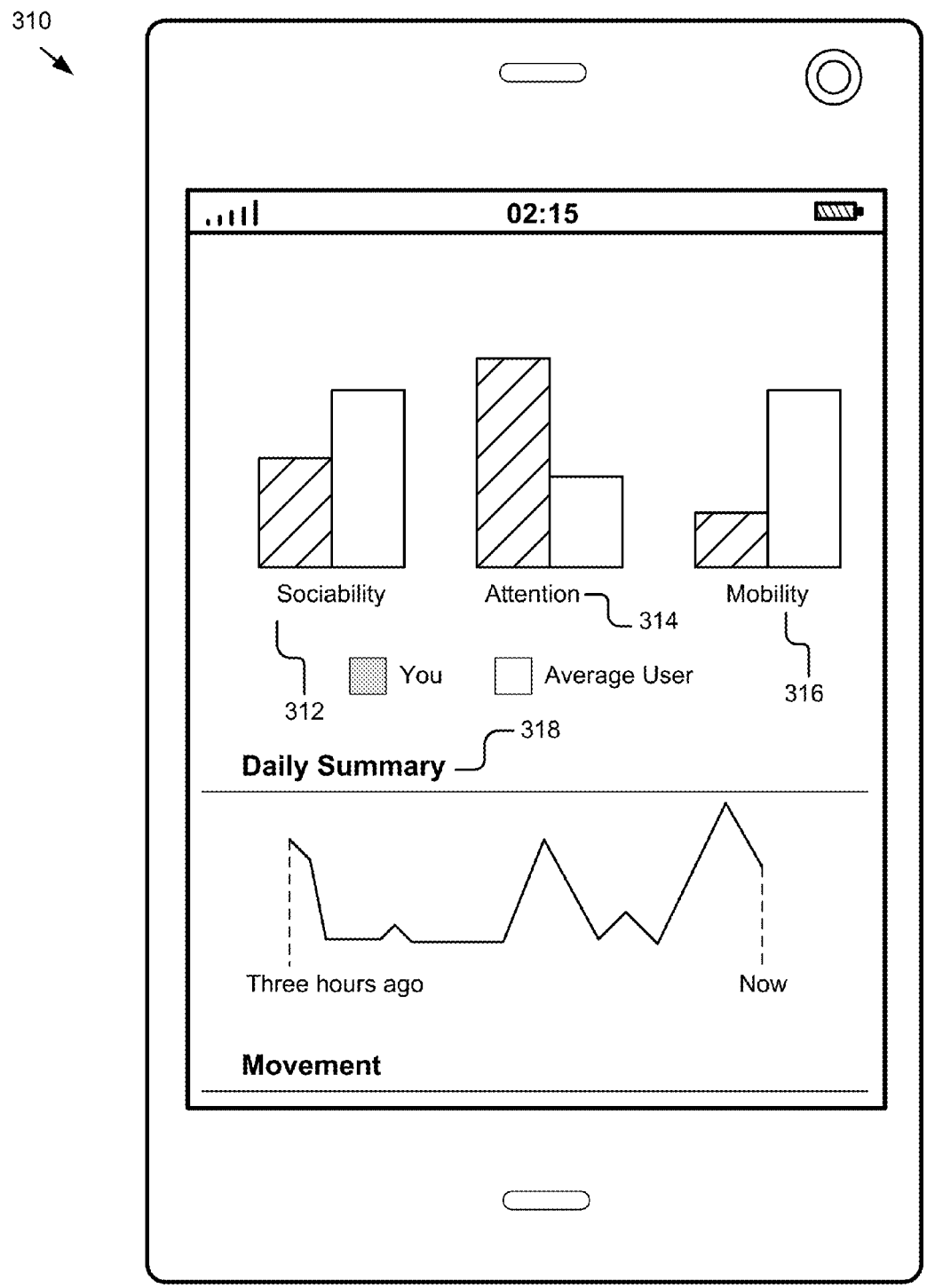
FIG. 3B is a graphic representation of an example user interface for presenting analytics data to a user.

FIG. 3B is a graphic representation 310 of an example user interface for presenting analytics data to a user. The example user interface compares a user's well-being to that of an average of all the participants, where the well-being is determined based on sociability 312, attention 314 and mobility 316. Sociability shows that the user interacted with a number of people, for example, based on check-ins, detection of the user's user device 115 in proximity to the user device 115 of other people in the user's social group, etc. Attention 314 can be measured based on the amount of time that the user spent viewing content on the user device 115. Mobility 116 can be determined based on how much the user moved during the day. For example, a user that went from home to work to home is less mobile than a user that went to work, took a bike ride at lunch, went to a concert and then went home. The example user interface also depicts how the user can view additional metadata about one of the areas. In this example, the daily summary 318 that illustrates the user's mobility 316 from three hours ago until now. The example user interface may include other graphics depicting results from the analytics engine 212, such as the user's focus 314 and sociability 312 during a particular time period.

Figure 3C:
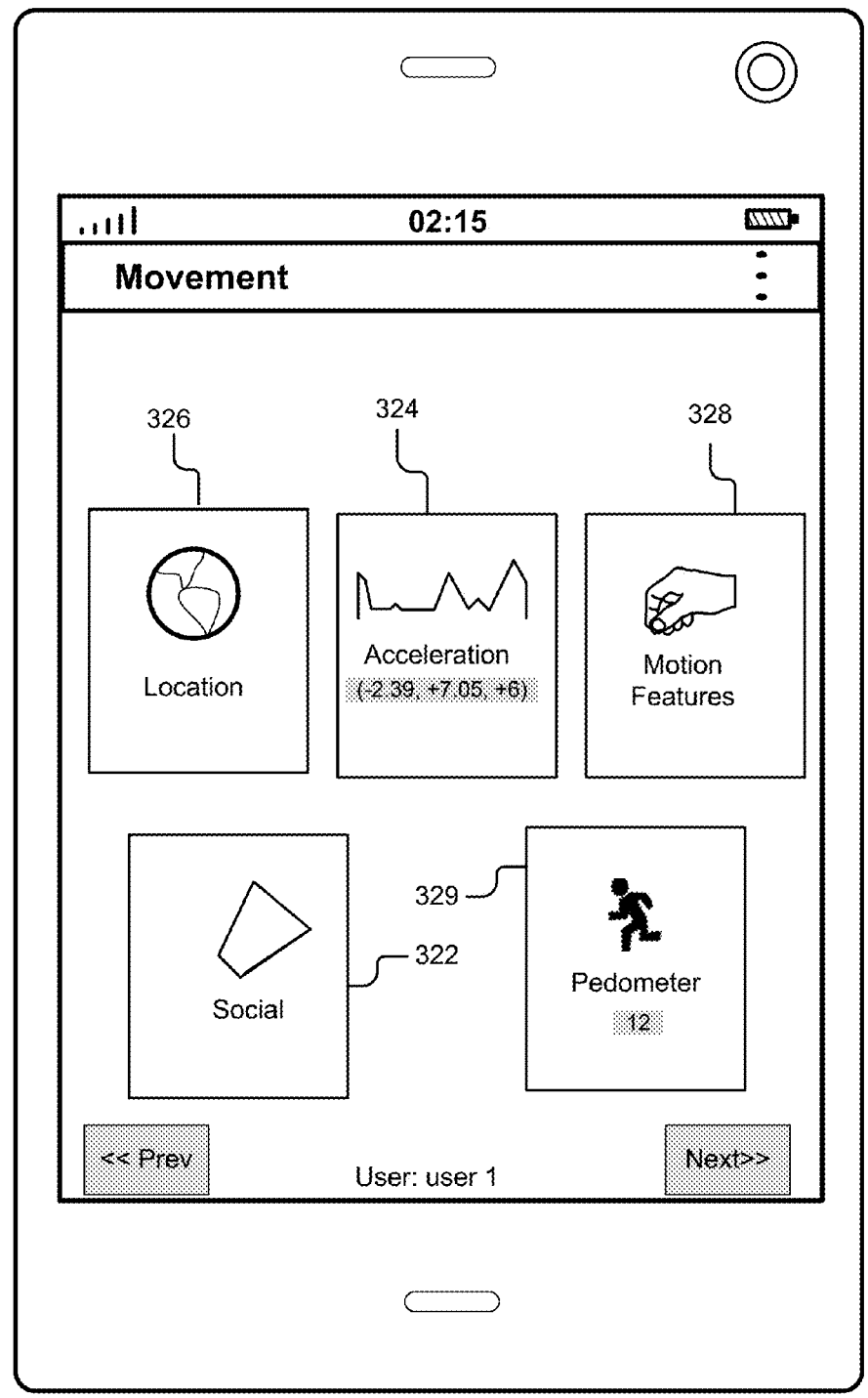
FIGS. 3C and 3D are graphic representations of example user interfaces for inferring human behavior from raw data.
Figure 3D:
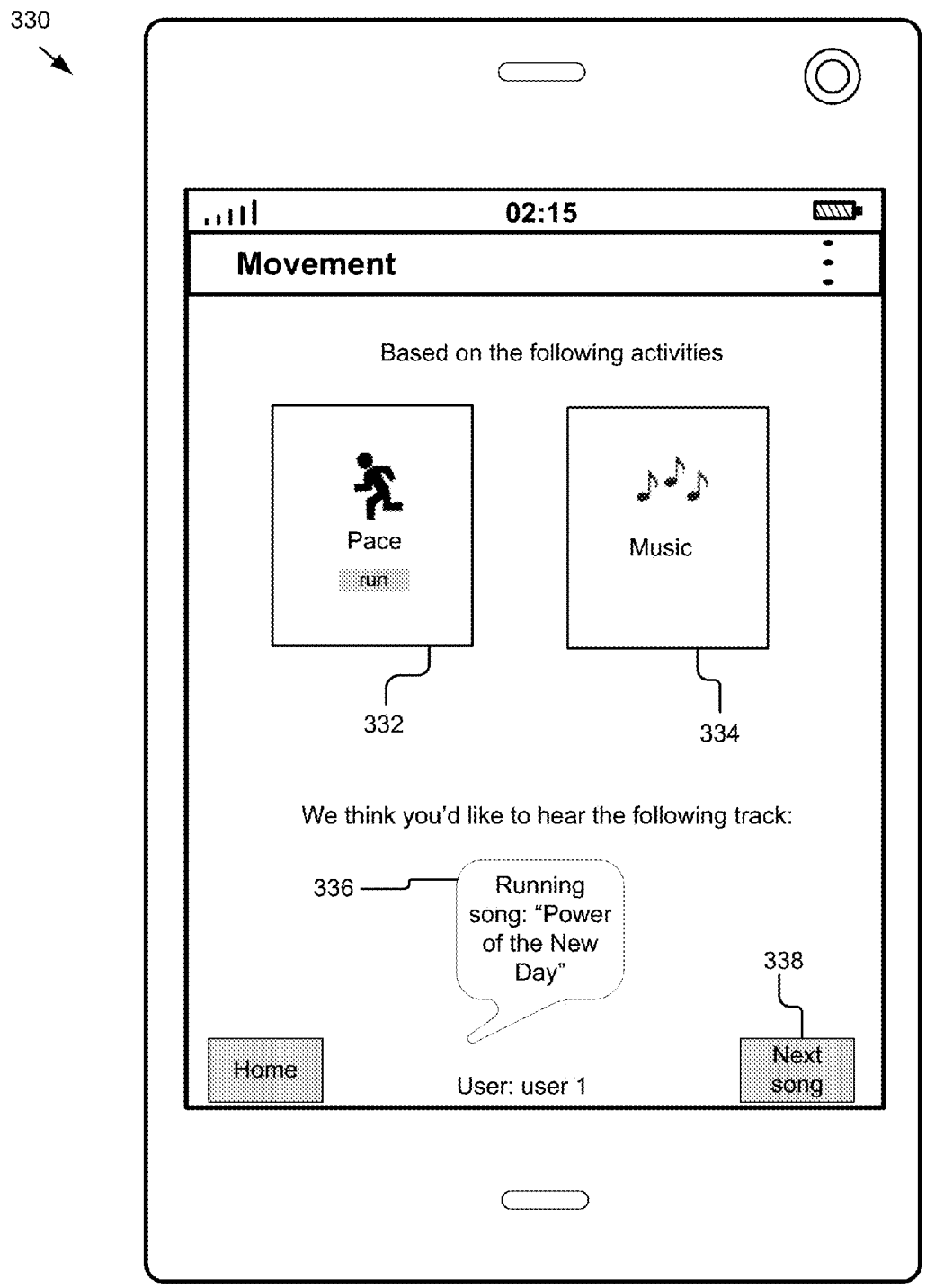

FIGS. 3C and 3D are graphic representations 320 and 330 of example user interfaces for depicting how human activities were identified from raw data. Referring to FIG. 3C, the activity identifier 208 uses multiple applications to determine activities being performed by the user. In this example, the applications could be based on virtual detectors 202 and/or hardware sensors 252. The acceleration application 324 shows that the user is increasing speed, the location application 326 shows the path the user is taking, the pedometer application 329 processes the number of steps taken by the user, the motion features application 328 determines that the user is moving and the social application 322 shows that the user posted a status about running. Based on all the human understandable activities determined by the filter engine 206, the activity identifier 208 determines that the user is running. In one embodiment, an output from one application can be used to inform another application. For example, the location application 326 can receive data from the pedometer application 329 and the acceleration data 324 to confirm the user's location. In instances where the location application 326 failed to identify the user's location (for example because the user took a run in the mountains), the location application 326 uses the output from the other applications to fill in missing information. Referring to FIG. 3D, the example user interface indicates the user is listening to music (e.g., a music activity shown in circle 334) during a running activity shown in circle 332. The example user interface may present a message 336 requesting the user to confirm whether the song being played is the user's favorite song for a running activity.

Figure 3E:
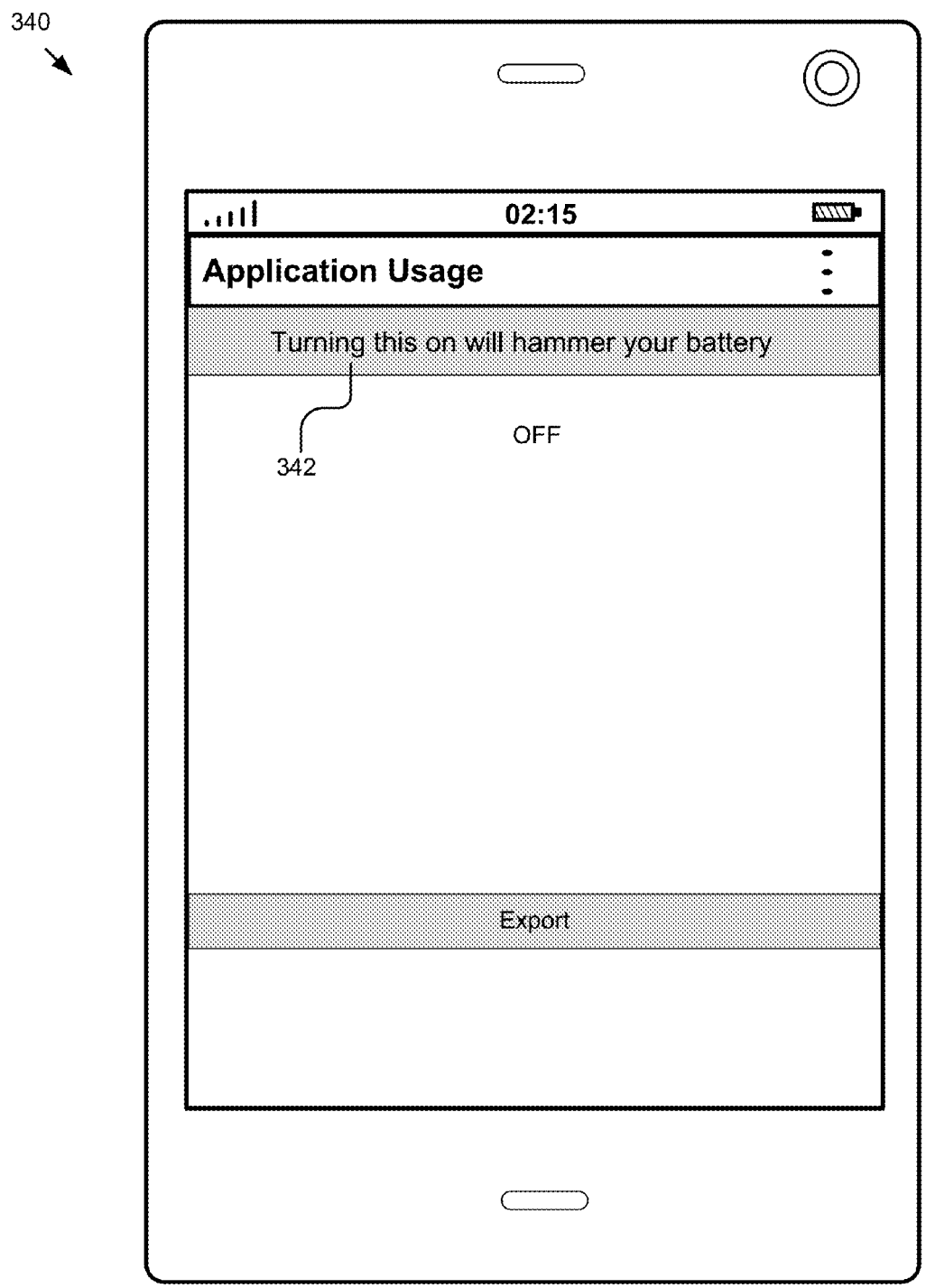
FIG. 3E is a graphic representation of an example user interface for providing an alerting message to a user during data collection.

FIG. 3E is a graphic representation 340 of an example user interface for providing an alert message 342 to a user.

The alert message 342 indicates the data collection from a particular application may consume the user device 115's battery power.

Figure 3F:
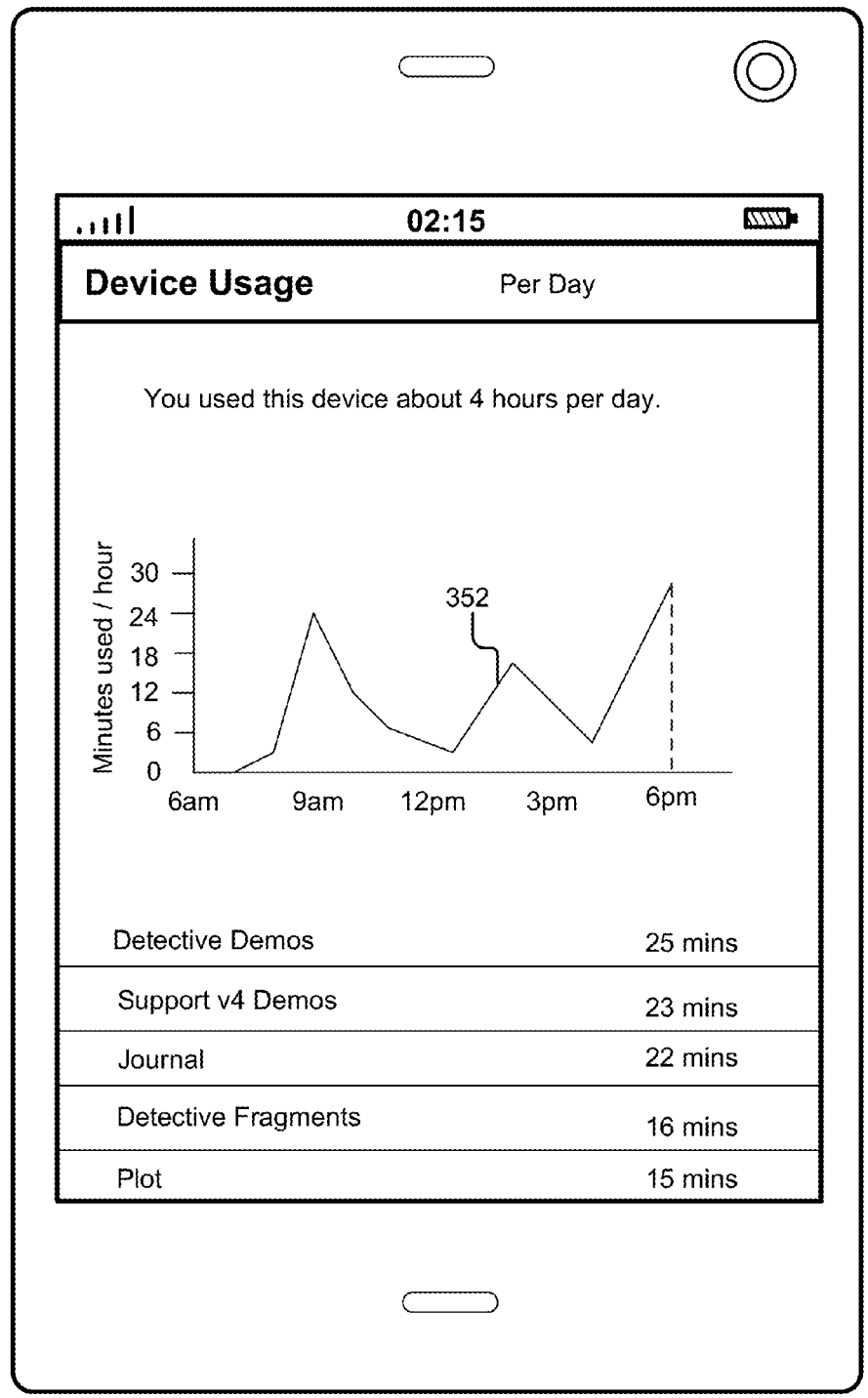
FIGS. 3F and 3G are graphic representations of example user interfaces for providing a summary of a user's activities.
Figure 3G:
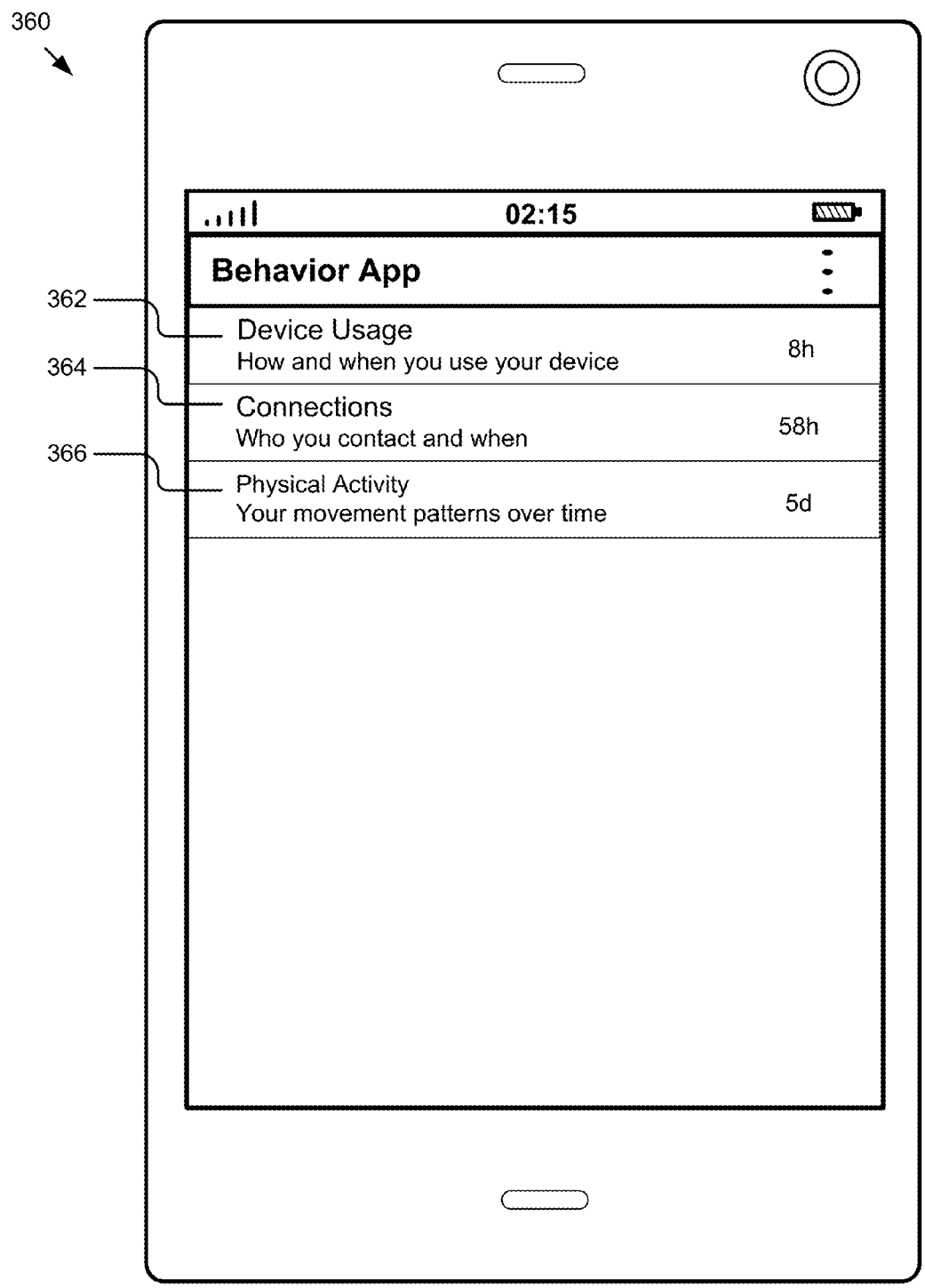

FIGS. 3F and 3G are graphic representations 350 and 360 of example user interfaces for providing a summary of activities. Referring to FIG. 3F, the example user interface illustrates a summary of a user's usage of his or her user device 115 per day. The graphic 352 illustrates how many minutes per hour the user uses the user device 115 from 6:00 AM to 6:00 PM. Referring to FIG. 3G, the example user interface includes a summary of device usage 362 for a first time period, a summary of connections 364 for a second time period and a summary of physical activities 366 for a third time period.

FIG. 4A is a graphic representation 400 of another example user interface for providing a summary of a user's activities in a particular day. The example user interface includes a summary of physical activities 402 (e.g., walking, biking, driving), a summary of applications 404 used by the user, a summary of posts 406 published by the user on different social networks, a summary of people 408 that performed an activity with the user, a summary of photos 410 shared by the user, talking levels 412 of the user and the weather 414.

Figure 4B:
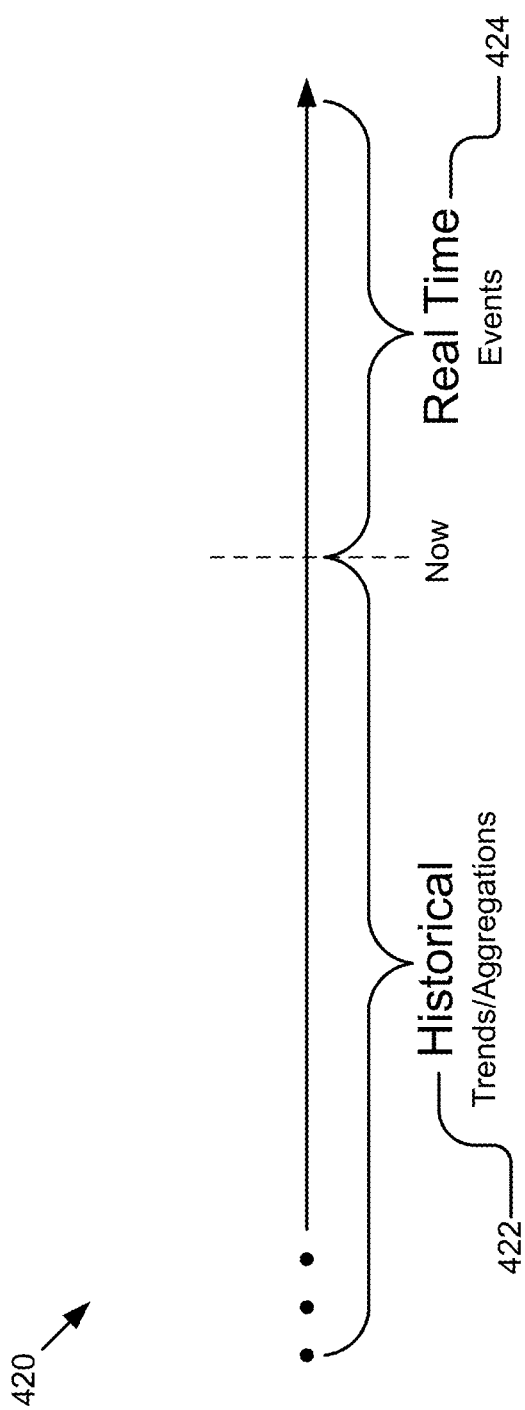
FIG. 4B is a graphic representation illustrating an example event stream.
Figure 4C:
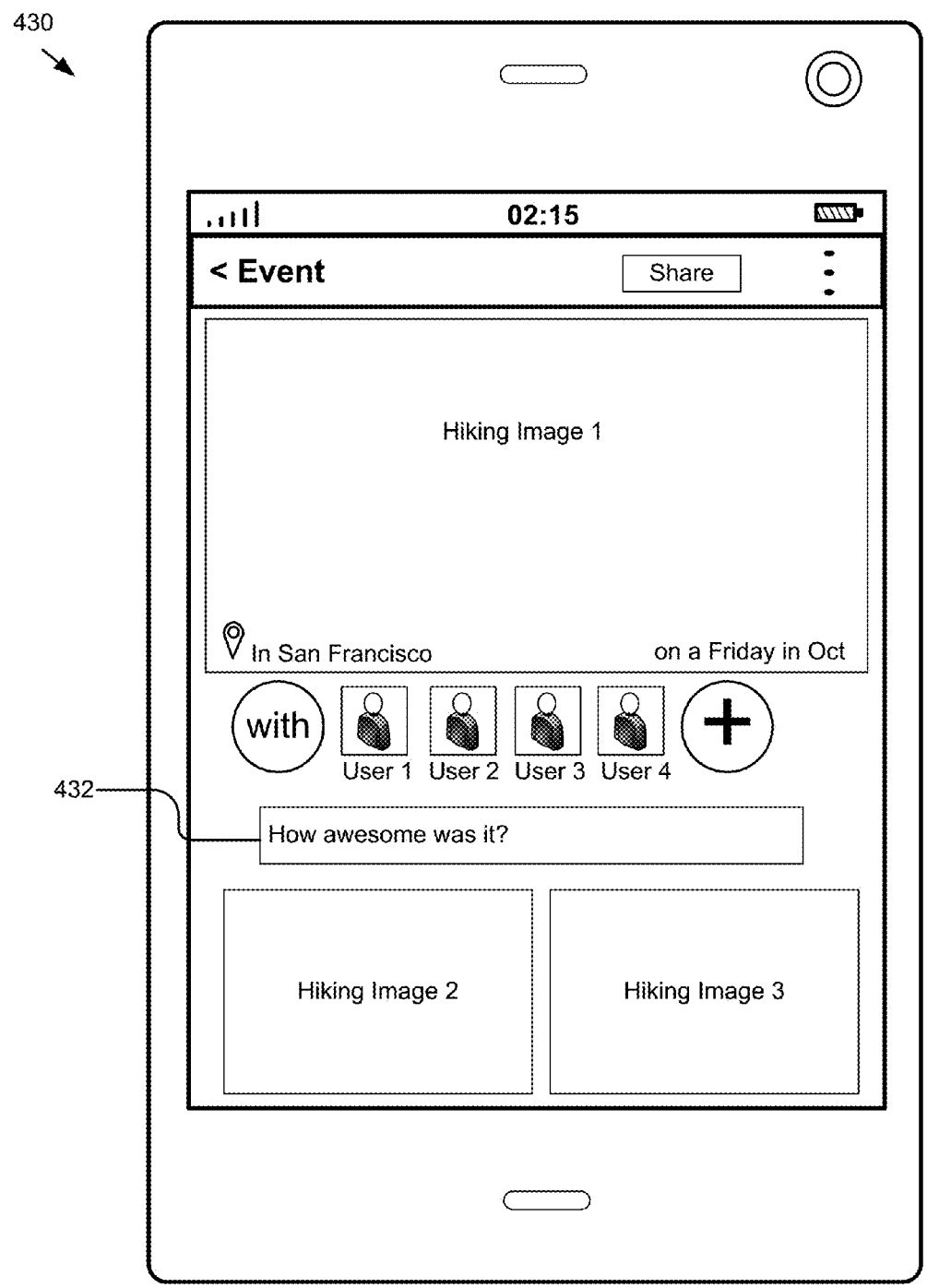
FIGS. 4C-4E are graphic representations of example user interfaces for providing various events to a user.
Figure 4D:
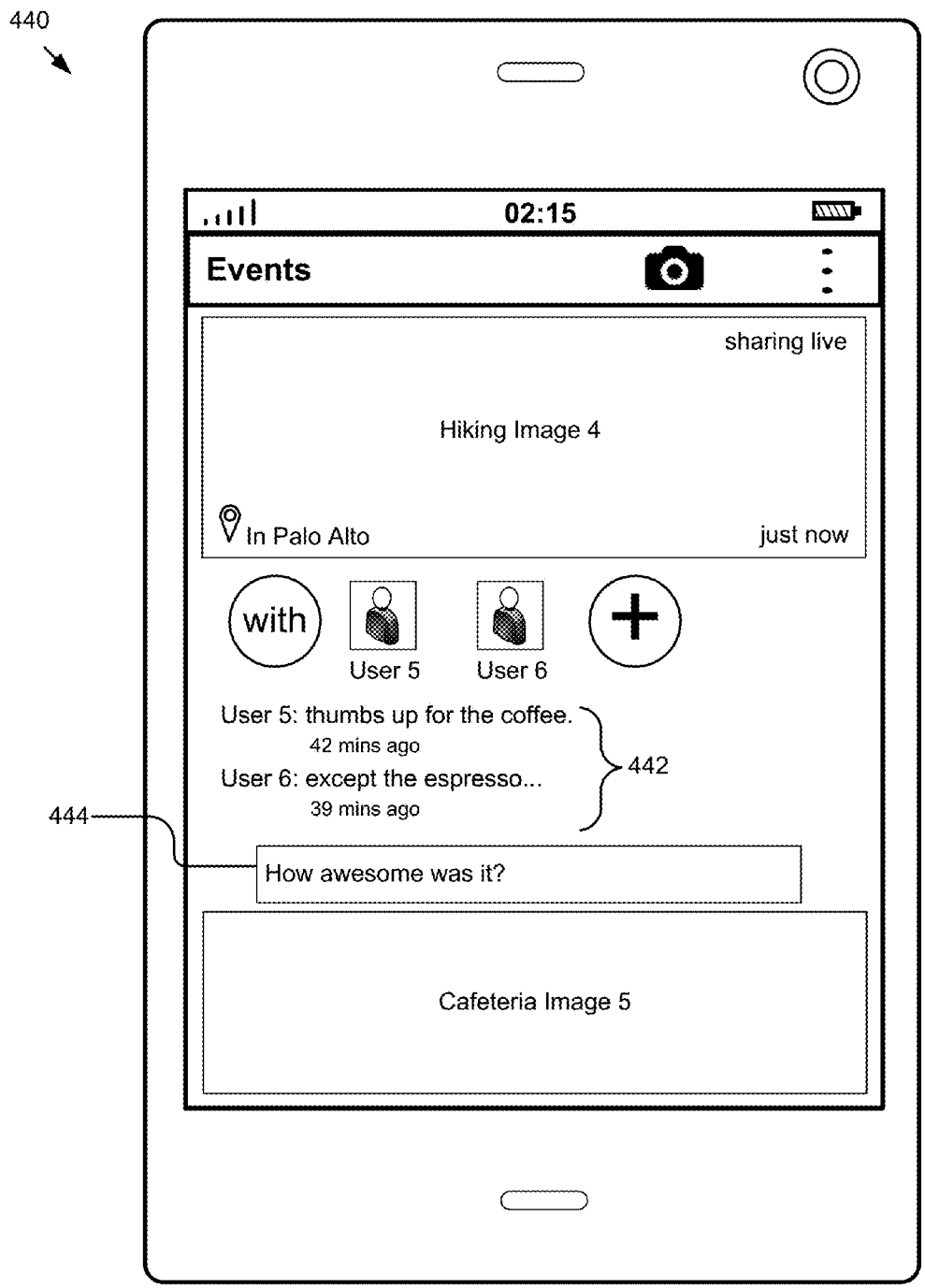
Figure 4E:
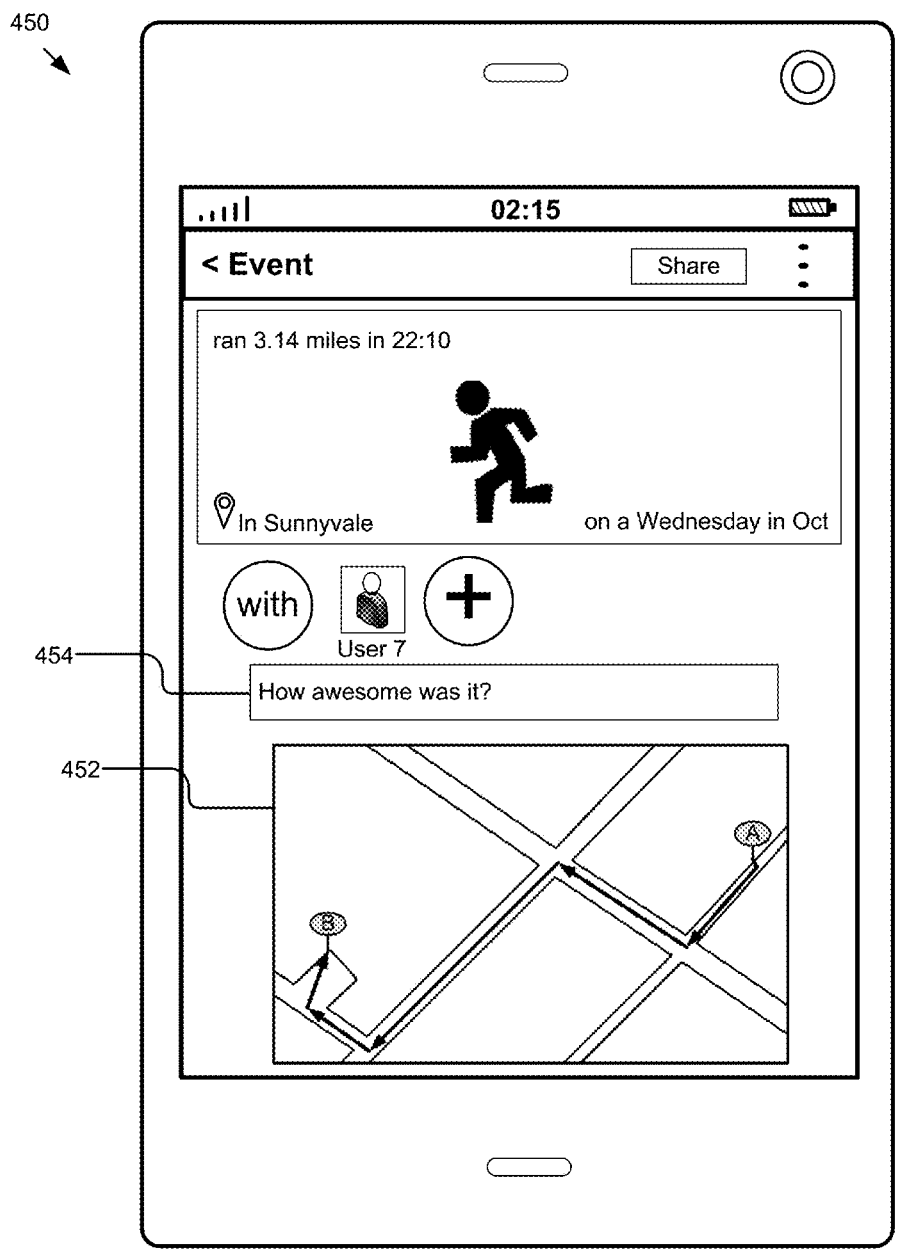

FIG. 4B is a graphic representation 420 illustrating an example event stream.

The example event stream includes historical events 422 and real-time events 424. The example event stream is a brief illustration of how historical information including trends and aggregation are used to inform real-time events. For example, a user's previous activities and confirmation of those activities helps inform the likelihood that a user is currently performing the same activity.

FIGS. 4C-4E are graphic representations 430, 440 and 450 of example user interfaces for providing example events to a user. Referring to FIG. 4C, the example user interface illustrates a hiking event occurring in San Francisco on a Friday in October. The user performs the hiking event with User 1, User 2, User 3 and User 4. The example user interface includes a first hiking image 1, a second hiking image 2 and a third hiking image 3, with each image depicting a different scene. The images can be posted by the same user or different users participating in the hiking event. The user can make a comment on the hiking event via a comment box 432.

Referring to FIG. 4D, the example user interface illustrates a coffee event occurring in Palo Alto with User 5 and User 6. The example user interface includes a coffee image 4 which was recently shared. The example user interface also includes a cafeteria image 5 depicting a cafeteria where the users bought coffee and comments 442 from User 5 and User 6 discussing the coffee in the cafeteria. The user can make a comment on the coffee event or the cafeteria via a comment box 444.

Referring to FIG. 4E, the example user interface illustrates a running event occurring in Sunnyvale on a Wednesday in October with User 7. The example user interface includes a map 452 indicating a running path and a comment box 454 for the user to make a comment on the running event.

Figure 5A:
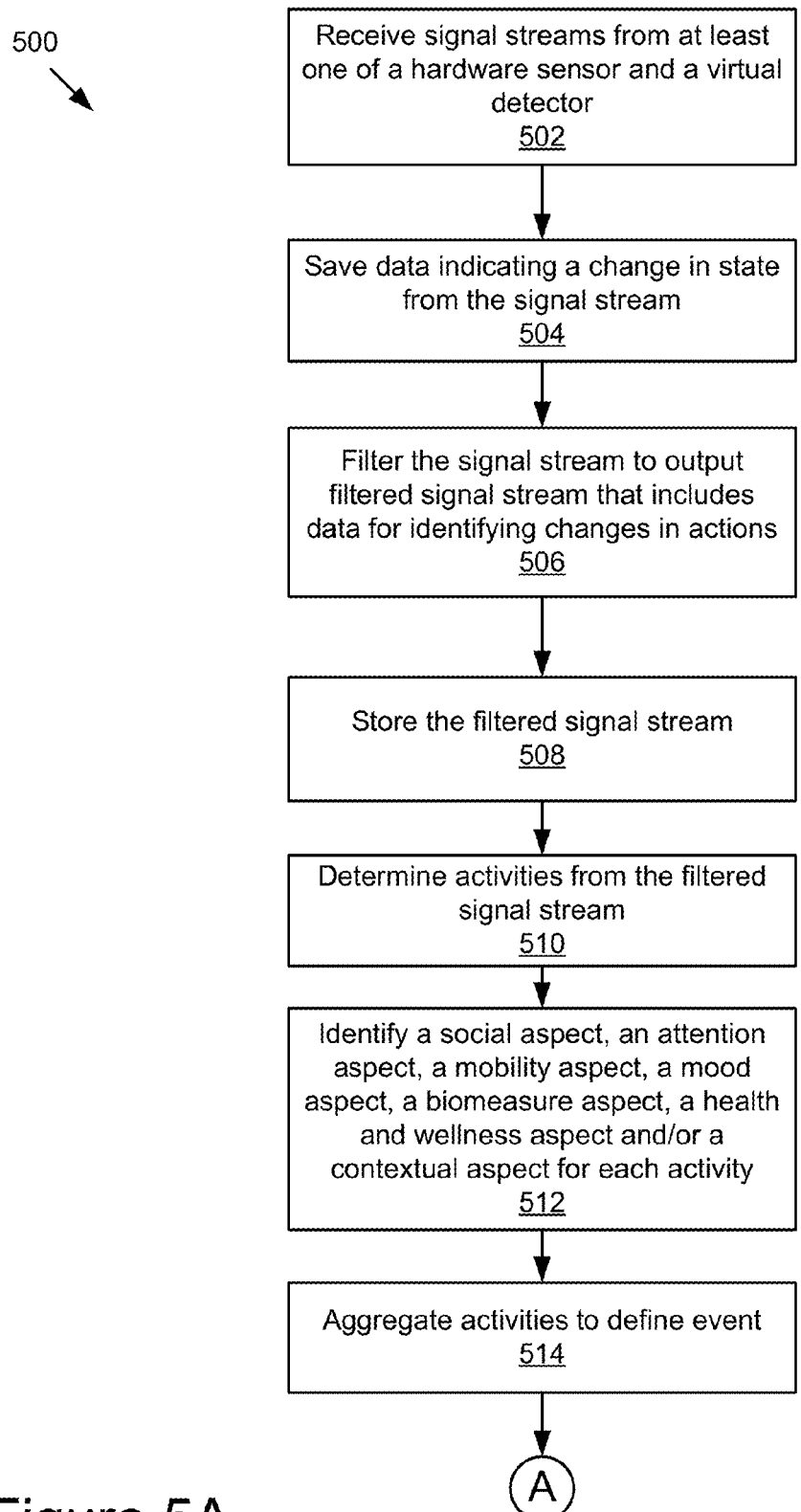
FIGS. 5A and 5B are flowcharts of an example method for providing an event stream to a user on a user device side.
Figure 5B:
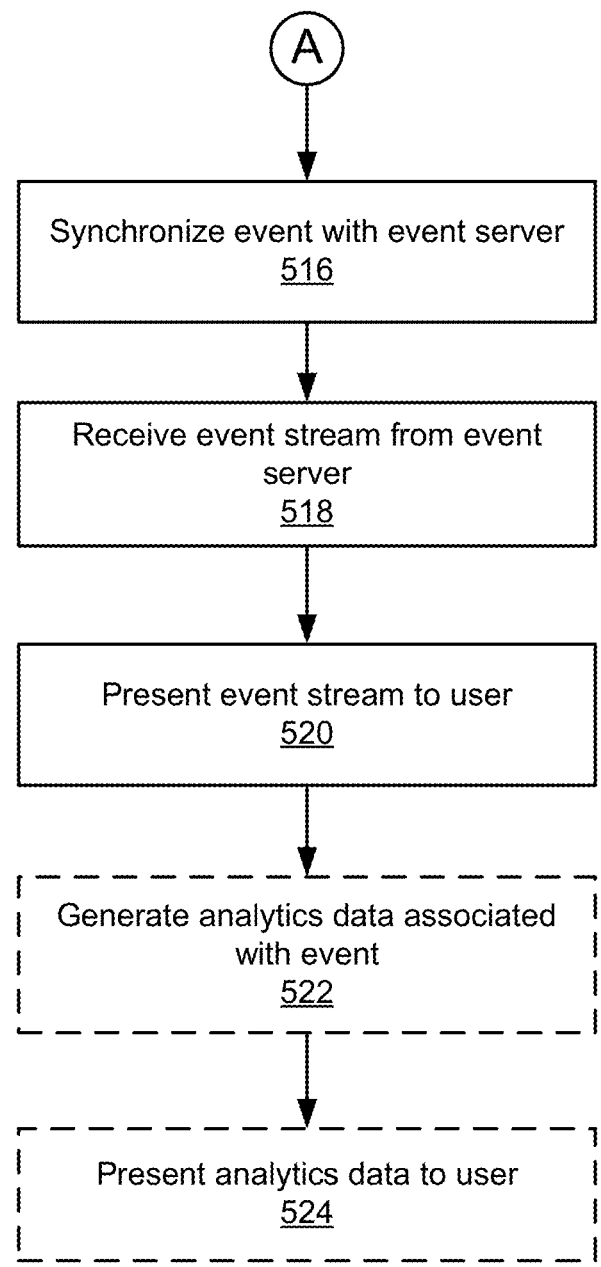

FIGS. 5A and 5B are flowcharts of an example method 500 for providing an event stream to a user on a user device side. Referring to FIG. 5A, the processing unit 204 receives 502 signal streams from at least one of a hardware sensor 252 and a virtual detector 202. The processing unit 204 saves 504 data indicating a change in state from the signal stream. The filter engine 206 filters 506 the signal stream to output a filtered signal stream. The filtered stream can be normalized between data types. The filter engine 206 stores 508 the filtered signal stream. The activity identifier 208 determines 510 one or more activities associated with the user from the filtered signal stream. The activity identifier 208 identifies 512 a social aspect, an attention aspect, a mobility aspect, a mood aspect, a biomeasure aspect, a health and wellness aspect and/or a contextual aspect for each activity. The aggregator 210 aggregates 514 the one or more activities to define an event.

Referring to FIG. 5B, the syncing engine 216 synchronizes 516 the event with the event server 107. The user interface engine 214 receives 518 an event stream from the event server 107 and presents 520 the event stream to the user on the user device 115 via a user interface. Optionally, the analytics engine 212 generates 522 analytics data associated with the event, and the user interface engine 214 presents 524 the analytics data to the user via a user interface.

Figure 6A:
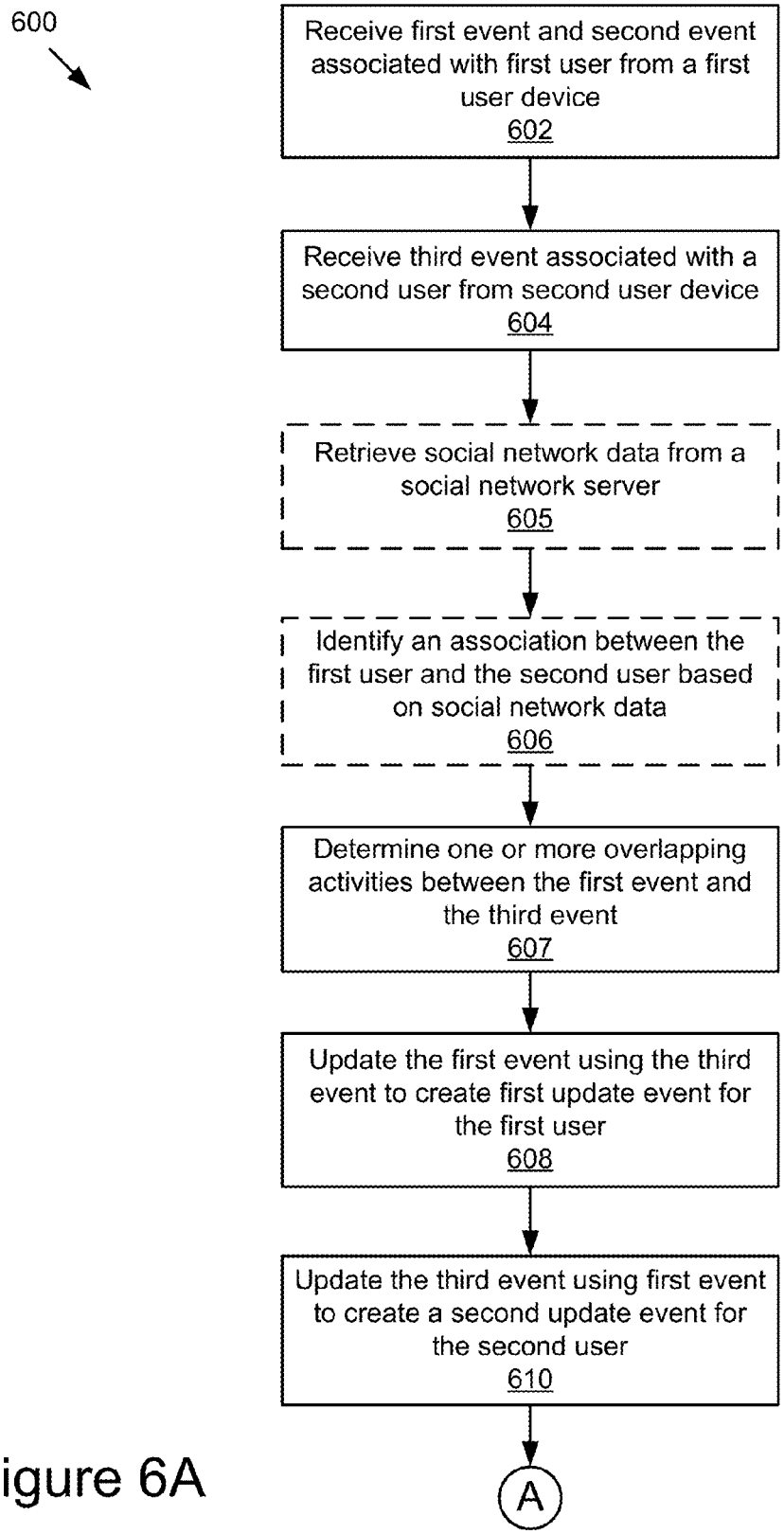
FIGS. 6A and 6B are flowcharts of an example method for generating event streams on a server side.
Figure 6B:
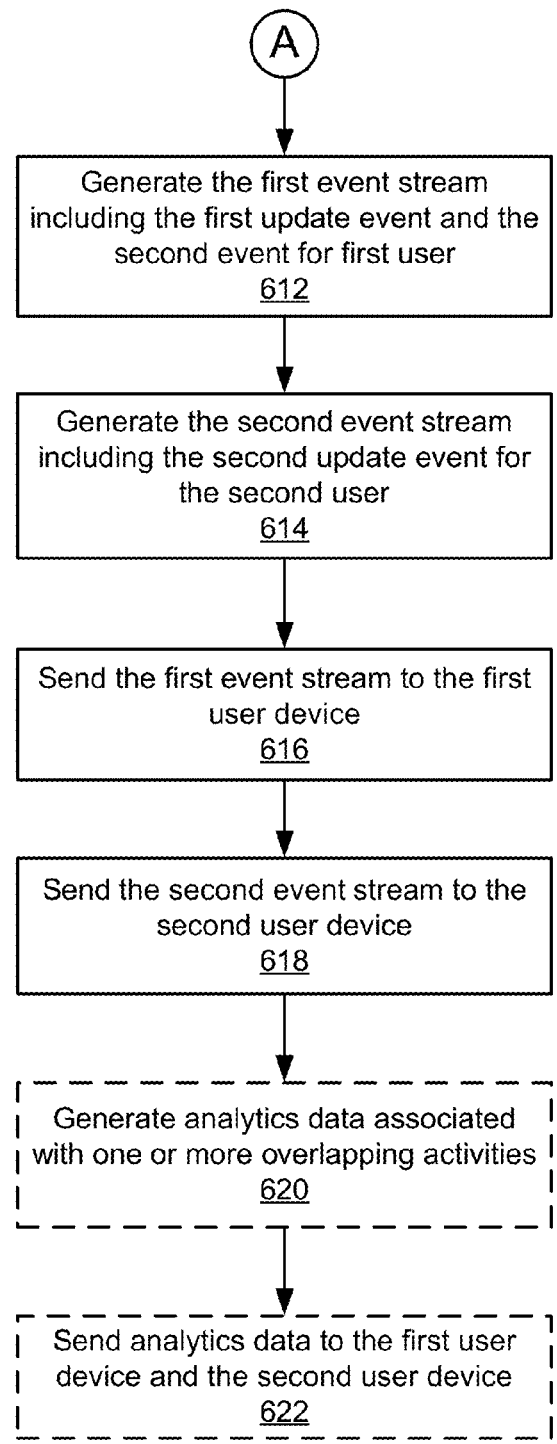

FIGS. 6A and 6B are flowcharts of an example method 600 for generating event streams on a server side. Referring to FIG. 6A, the stream generator 211 receives 602 a first event associated with a first user from a first user device 115. The stream generator 211 receives 604 a second event associated with a second user from a second user device 115. Optionally, the stream generator 211 retrieves 605 social network data associated with the first user and/or the second user from the social network server 101, and identifies 606 an association between the first user and the second user based on the social network data. For example, the stream generator 211 optionally determines that the first user is connected to the second user in a social graph and will not associate events in the subsequent steps unless the users have a connection on a social graph that exceeds a threshold. For example, the first user and the second user have a one-degree relationship where the first user is associated with the second user and the second user is associated with the first user.

The stream generator 211 determines 607 one or more overlapping activities between the first event and the second event. The stream generator 211 updates 608 the first event using the second event to create a first update event for the first user. For example, the first update event includes a combination of the first event and the second event that have one or more overlapping activities, such as if the first and second user were at the event together because they went jogging together. In some embodiments, the stream generator 211 updates 610 the second event using the first event to create a second update event for the second user. There are some instances where the update might occur, such as if the second user does not follow the first user in the social graph and therefore would not want the event stream to include information about the first user.

The stream generator 211 generates 610 a first event stream including the first update event and the second event for the first user. Referring to FIG. 6B, the stream generator 211 generates 612 a second event stream including the second update event for the second user. The stream generator 211 sends 614 the first event stream to the first user device 115. The stream generator 211 sends 616 the second event stream to the second user device 115. Optionally, the analytics engine 212 generates 618 analytics data associated with the one or more overlapping activities, and sends 620 the analytics data to the first user device 115 and the second user device 115 for presenting the analytics data to the first user and the second user respectively. The analytics data could include, for example, a summary of all the shared activities between the first user and other users as illustrated in FIG. 4A.

In the above description, for purposes of explanation, numerous specific details are set forth in order to provide a thorough understanding of the specification. It will be apparent, however, to one skilled in the art that the disclosure can be practiced without these specific details. In other embodiments, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more processors, a first signal stream from a hardware sensor associated with a first user device of a first user;
receiving, using the one or more processors, a second signal stream from a virtual detector associated with the first user device of the first user, the second signal stream includes software data related to software operational on the first user device;
defining, using the one or more processors, a first event for the first user based on the first signal stream and the second signal stream;
polling, using the one or more processors, for a second user device within proximity to the first user based on a second user associated with the second user device being associated with the first user on a social graph, the second user device is within proximity to the first user when a distance between the second user device and the first user is shorter than a predetermined distance;
receiving, using the one or more processors, a second event associated with the second user from the second user device;
determining, using the one or more processors, one or more overlapping activities between the first event and the second event;
updating, using the one or more processors, the first event using the second event to generate a first update event responsive to a determination of the one or more overlapping activities; and
generating, using the one or more processors, a first event stream that includes the first update event for the first user.

2. The method of claim 1, wherein determining the one or more overlapping activities comprises:
retrieving social network data from a social network server;
identifying an association between the first user and the second user based on the social network data; and
determining the one or more overlapping activities based on the association between the first user and the second user.

3. The method of claim 1, wherein the second event includes information about the first user being associated with the second event and the first user device lacks capabilities for detecting the second user device.

4. The method of claim 1, further comprising sending the first event stream to the first user device.

5. The method of claim 1, further comprising:
receiving a signal stream associated with the first user;
saving data from the signal stream that indicates a change of state;
identifying one or more activities associated with the first user from the filtered stream; and
aggregating the one or more activities to define the first event associated with the first user.

6. The method of claim 1, wherein each of the one or more overlapping activities includes a social aspect, an attention aspect, a mobility aspect, a mood aspect, a biomeasure aspect, a health and wellness aspect and a contextual aspect.

7. The method of claim 1, further comprising:
detecting a presence of a third device associated with the first user device at a first timestamp;
detecting a presence of the third device associated with the second user device at a second timestamp; and
responsive to a time difference between the first timestamp and the second timestamp being within a predetermined threshold, determining that the first user device and the second user device are within proximity of each other, wherein the first user device and the second user device are within proximity if a distance between the first and second user devices is shorter than a predetermined distance.

8. The method of claim 1, wherein the one or more overlapping activities are performed together by the first user and the second user.

9. The method of claim 1, further comprising generating analytics data associated with the one or more overlapping activities.

10. The method of claim 1, further comprising posting content to a social network that includes content captured in association with overlapping activities.

11. The method of claim 1, further comprising determining that the first user owns a third user device based on a distance between the first user device and the third user device is shorter than a predetermined distance responsive to exceeding a threshold time period.

12. A computer program product comprising a non-transitory computer-readable medium including a computer readable program, wherein the computer readable program when executed on a computer causes the computer to:
receive a first signal stream from a hardware sensor associated with a first user device of a first user;
receive a second signal stream from a virtual detector associated with the first user device of the first user, the second signal stream includes software data related to software operational on the first user device;
define a first event for the first user based on the first signal stream and the second signal stream;
poll for a second user device within proximity to the first user based on a second user associated with the second user device being associated with the first user on a social graph, the second user device is within proximity to the first user when a distance between the second user device and the first user is shorter than a predetermined distance;
receive a second event associated with the second user from the second user device;
determine one or more overlapping activities between the first event and the second event;
update the first event using the second event to generate a first update event responsive to a determination of the one or more overlapping activities; and
generate a first event stream that includes the first update event for the first user.

13. The computer program product of claim 12, wherein determining the one or more overlapping activities comprises:
   retrieving social network data from a social network server;
   identifying an association between the first user and the second user based on the social network data; and
   determining the one or more overlapping activities based on the association between the first user and the second user.

14. The computer program product of claim 12, wherein the second event includes information about the first user being associated with the second event and the first user device lacks capabilities for detecting the second user device.

15. The computer program product of claim 12, wherein the computer readable program when executed on the computer causes the computer to:
   receive a signal stream associated with the first user;
   save data from the signal stream that indicates a change of state;
   identify one or more activities associated with the first user from the filtered stream; and
   aggregate the one or more activities to define the first event associated with the first user.

16. The computer program product of claim 12, wherein the computer readable program when executed on the computer causes the computer to also send the first event stream to the first user device.

17. The computer program product of claim 12, wherein each of the one or more overlapping activities includes a social aspect, an attention aspect, a mobility aspect, a mood aspect, a biomeasure aspect, a health and wellness aspect and a contextual aspect.

18. The computer program product of claim 12, wherein the computer readable program when executed on the computer causes the computer to also:
   detect a presence of a third device associated with the first user device at a first timestamp;
   detect a presence of the third device associated with the second user device at a second timestamp; and
   responsive to a time difference between the first timestamp and the second timestamp being within a predetermined threshold, determine that the first user device and the second user device are within proximity of each other, wherein the first user device and the second user device are within proximity if a distance between the first and the second user devices is shorter than a predetermined distance.

\* \* \* \* \*